(12) United States Patent
Kumar et al.

(10) Patent No.: US 6,288,724 B1
(45) Date of Patent: Sep. 11, 2001

(54) CLIPPING AND TRAPEZOID DECOMPOSITION OF POLYGONS FOR PRINTING FILES IN A PAGE DESCRIPTION LANGUAGE

(75) Inventors: Suvarna Harish Kumar, Bangalore (IN); Venkat V. Easwar, Cupertino, CA (US); Arunabha Ghose, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/397,172

(22) Filed: Sep. 16, 1999

(Under 37 CFR 1.47)

Related U.S. Application Data

(60) Provisional application No. 60/100,619, filed on Sep. 16, 1998.

(51) Int. Cl.[7] .................................................. G06T 15/30
(52) U.S. Cl. ............................ 345/434; 345/118; 707/525
(58) Field of Search ........................... 345/434, 433, 345/421, 423, 425, 427, 118, 131, 135; 707/525, 526, 527; 101/93.21, 93.2; 382/199

(56) References Cited

U.S. PATENT DOCUMENTS

| | | | |
|---|---|---|---|
| 3,889,107 | * 6/1975 | Sutherland | 345/425 |
| 4,933,889 | * 6/1990 | Meshkat et al. | 716/20 |
| 4,958,305 | * 9/1990 | Piazza | 345/427 |
| 5,051,737 | * 9/1991 | Akeley et al. | 345/434 |
| 5,268,995 | * 12/1993 | Diefendorff et al. | 345/422 |
| 5,276,783 | * 1/1994 | Fossum | 345/423 |
| 5,295,235 | * 3/1994 | Newman | 345/433 |
| 5,630,039 | * 5/1997 | Fossum | 345/434 |
| 5,720,019 | * 2/1998 | Koss et al. | 345/434 |
| 5,877,773 | * 3/1999 | Rossin et al. | 345/434 |
| 6,128,767 | * 10/2000 | Chapman | 716/1 |

* cited by examiner

Primary Examiner—Matthew Luu
Assistant Examiner—Thu-Thao Havan
(74) Attorney, Agent, or Firm—Robert D. Marshall, Jr.; W. James Brady, III; Frederick J. Telecky, Jr.

(57) ABSTRACT

This invention cures many inefficiencies with known scan conversion methods. This invention employs a edge array rather than a set linked list from an array of pointers equal in number to the number of scan lines. This invention thus eliminates storage of linked list pointers which in the prior art included many null pointers resulting in better memory utilization. es on-chip memory when employing a single chip microprocessor. This invention sorts the active edge table only at edge intersections and vertices, thus eliminating much unneeded sorting. This invention permits integrated clipping of a subject polygon by a clip polygon and forming trapezoids filling the clipped area by activating trapezoid formation at every vertex of either polygon and at every edge intersection. This process saves code space and computer processing time. This invention efficiently utilizes the resources of a multiprocessor integrated circuit by spawning of subtasks from a RISC type processor to one or more DSP type processors.

3 Claims, 13 Drawing Sheets

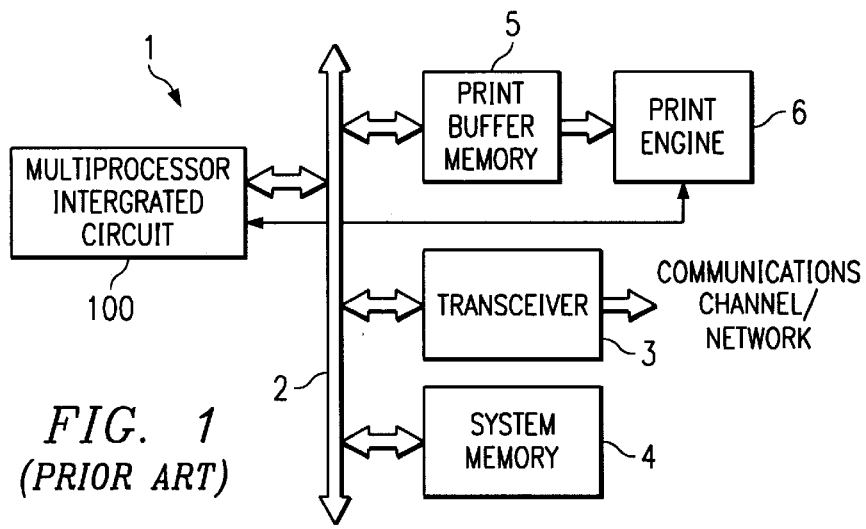
FIG. 1
(PRIOR ART)
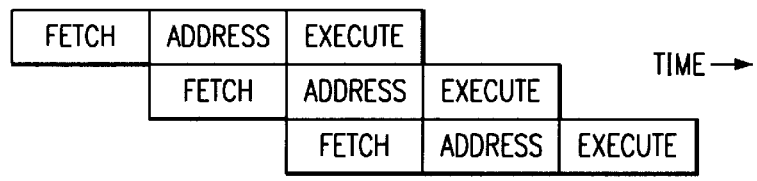
FIG. 4
(PRIOR ART)
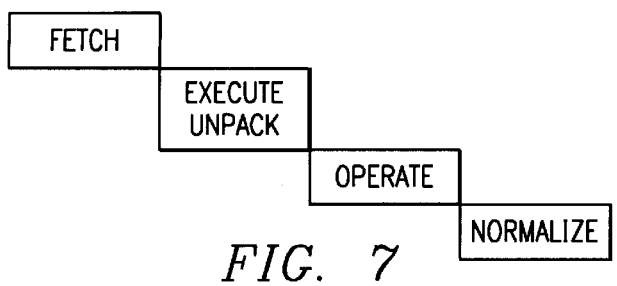
FIG. 6
(PRIOR ART)
FIG. 7
(PRIOR ART)

SQUARE=CLIP POLYGON
DIAMOND=SUBJECT POLYGON

DIAMOND=SUBJECT POLYGON
SQUARE=CLIP POLYGON

S=SUBJECT POLYGON
C=CLIP POLYGON

| CE1 x1 | CE4 x2 | AET OF CLIP POLYGON AT SCANLINE CYMIN |
|---|---|---|

| E1 x3 | E4 x4 | AET OF SUBJECT POLYGON AT SCANLINE CYMIN |
|---|---|---| x1,x2,x3,x4 XBOTTOM VALUES OF RESPECTIVE EDGES.

FROM FIGURE 17, x1<x3 AND x2>x4
xleft=MAXIMUM (x1,x3) i.e. EDGE E1
xright=MINIMUM (x2,x4) i.e. EDGE E4

AETs AT SCANLINE Y7 xb1...xb6 ARE RESPECTIVE XBOTTOMS
OF THE EDGES IN THE AETs

FROM FIGURE 17, xb1<xb5 AND xb4>xb6
xleft=MAXIMUM (xb1,xb5) i.e. EDGE ce1
xright=MINIMUM (xb2,xb6) i.e. EDGE ce2
SECOND TRAPEZOID IS POSSIBLE AS THE AETs DID NOT REACH THE END OF LIST
xleft=MINIMUM (xb3,xb6) i.e. EDGE ce3
xright=MINIMUM (xb4,xb6) i.e. EDGE e3

US 6,288,724 B1

CLIPPING AND TRAPEZOID DECOMPOSITION OF POLYGONS FOR PRINTING FILES IN A PAGE DESCRIPTION LANGUAGE

This application claims priority under 35 USC §119(e)(1) of Provisional Application No. 60/100,619, filed Sep. 16, 1998.

TECHNICAL FIELD OF THE INVENTION

The technical field of this invention is printers and more particularly the electronics of printers that converts input data in the form of a page description file into control signals for the print engine.

BACKGROUND OF THE INVENTION

Current printers, particularly printers adapted to connect to a local area network and service plural network users, employ a page description language. PostScript is an example of such a page description language. Page description languages are programming languages that allow compact, flexible and device independent description of a page. A print file in a page description language lists the text and graphics to be printed on the page described. The description of the objects to be printed must be converted into a raster bitmap in a process called rasterization in order to be printed. Rasterization is the process of converting the page description into the individual dots making up the lines of the page in the order to be printed. This process enables the page to be printed by the print engine, which generally prints the page line by line from one edge to an opposite edge. The page rasterizer typically consists of an interpreter and a rasterizer. The interpreter parses the input data stream and creates drawing primitives, termed display list elements. The rasterizer does scan-conversion of these primitives.

Many objects in computer graphics applications and page description languages are described through polygons. Even curved shapes are generally approximated to nearest polygons and then rendered. To be printed or displayed these polygons must be converted into the scan technique used by the output device. Polygon scan conversion may be invoked thousands of times to render a graphics image into a refresh buffer. This method must not only create satisfactory images, but also must execute as rapidly as possible. Especially in applications like printers, the real time requirements are stringent to meet. Hence, faster techniques are always wanted.

Currently there are many known techniques to scan convert a polygon. The most popular technique is based on the edge and scan line coherence. If scan line n intersects an edge of a polygon, then scan line n+1 will generally also intersect the same edge. This can be exploited to scan convert a polygon by working with only a set of edges for any scan line. This set of edges is called the active edge table (AET). For the next scan line the new X intersections are computed by merely adding the slope of the edge to the current values. Any new edges intersecting this scan line are added to the active edge table. Further, edges in the active edge table which no longer intersect the next scan line are deleted.

Clipping a polygon against another polygon is very common in many computer graphics applications. Especially in the PostScript page descriptions, every polygon is clipped against the page boundaries. In addition to this rectangle clipping, the PostScript language allows clipping of any irregular shape with any other irregular shape.

If the polygons are of irregular shape, then it may not be possible to scan convert them in real time. So polygons are typically converted to a series of trapezoids. Since trapezoids have regular shape, they may be rendered in real time. In PostScript page rasterization, the decomposition of polygons to trapezoids is done in the interpreting stage. If the input page description involves clipping, then the process of page interpretation becomes slower. The decomposition into trapezoids is a two step process. The first step is clipping two polygons and obtaining the resultant polygon. The second step is converting the resultant polygon to a series of trapezoids. One way of converting a polygon to trapezoids draws scan lines at every vertex. This fixes the bottom and top scan lines for every trapezoid.

SUMMARY OF THE INVENTION

This invention cures many inefficiencies with known scan conversion methods. This invention permits integrated clipping of a subject polygon by a clip polygon and forming trapezoids filling the clipped area. This is achieved by activating trapezoid formation at every vertex of either polygon and at every edge intersection. This integrated process saves code space and computer time because page description languages often require both polygon clipping and trapezoid generation of the clipped area.

BRIEF DESCRIPTION OF THE DRAWINGS

These and other aspects of this invention are illustrated in the drawings, in which:

FIG. 1 illustrates the system architecture of an image processing system such as would employ this invention;

FIG. 4 illustrates in schematic form the pipeline stages of operation of the digital image/graphics processor illustrated in FIG. 2;

FIG. 6 illustrates the integer pipeline operation of the master processor;

FIG. 7 illustrates the floating point pipeline operation of the master processor;

DETAILED DESCRIPTION OF PREFERRED EMBODIMENTS

Figure 2:
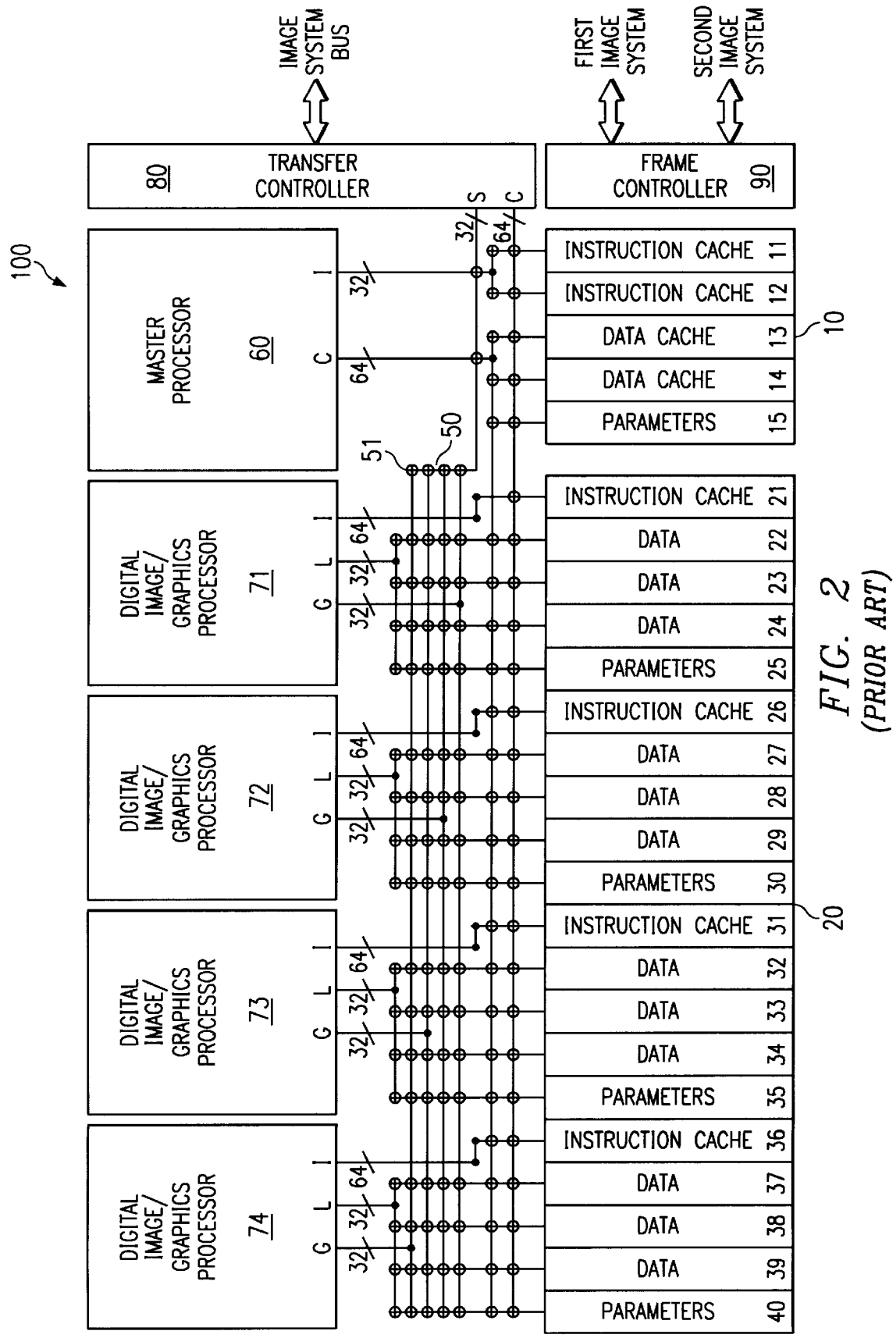
FIG. 2 illustrates the architecture of a single integrated circuit multiprocessor that forms the preferred embodiment of this invention.

FIG. 1 is a block diagram of a network printer system 1 including a multiprocessor integrated circuit 100 constructed for image and graphics processing according to this invention. Multiprocessor integrated circuit 100 provides the data processing including data manipulation and computation for image operations of the network printer system of FIG. 1. Multiprocessor integrated circuit 100 is bi-directionally coupled to a system bus 2.

FIG. 1 illustrates transceiver 3. Transceiver 3 provides translation and bidirectional communication between the network printer bus and a communications channel. One example of a system employing transceiver 3 is a local area network. The network printer system illustrated in FIG. 1 responds to print requests received via the communications channel of the local area network. Multiprocessor integrated circuit 100 provides translation of print jobs specified in a page description language, such as PostScript, into data and control signals for printing.

FIG. 1 illustrates a system memory 4 coupled to the network printer system bus. This memory may include video random access memory, dynamic random access memory, static random access memory, nonvolatile memory such as EPROM, FLASH or read only memory or a combination of these memory types. Multiprocessor integrated circuit 100 may be controlled either in wholly or partially by a program stored in the memory 4. This memory 4 may also store various types of graphic image data.

In the network printer system of FIG. 1 Multiprocessor integrated circuit 100 communicates with print buffer memory 5 for specification of a printable image via a pixel map. Multiprocessor integrated circuit 100 controls the image data stored in print buffer memory 5 via the network printer system bus 2. Data corresponding to this image is recalled from print buffer memory 5 and supplied to print engine 6. Print engine 6 provides the mechanism that places color dots on the printed page. Print engine 6 is further responsive to control signals from multiprocessor integrated circuit 100 for paper and print head control. Multiprocessor integrated circuit 100 determines and controls where print information is stored in print buffer memory 5. Subsequently, during readout from print buffer memory 5, multiprocessor integrated circuit 100 determines the readout sequence from print buffer memory 5, the addresses to be accessed, and control information needed to produce the desired printed image by print engine 6.

According to the preferred embodiment, this invention employs multiprocessor integrated circuit 100. This preferred embodiment includes plural identical processors that embody this invention. Each of these processors will be called a digital image/graphics processor. This description is a matter of convenience only. The processor embodying this invention can be a processor separately fabricated on a single integrated circuit or a plurality of integrated circuits. If embodied on a single integrated circuit, this single integrated circuit may optionally also include read only memory and random access memory used by the digital image/graphics processor.

FIG. 2 illustrates the architecture of the multiprocessor integrated circuit 100 of the preferred embodiment of this invention. Multiprocessor integrated circuit 100 includes: two random access memories 10 and 20, each of which is divided into plural sections; crossbar 50; master processor 60; digital image/graphics processors 71, 72, 73 and 74; transfer controller 80, which mediates access to system memory; and frame controller 90, which can control access to independent first and second image memories. Multiprocessor integrated circuit 100 provides a high degree of operation parallelism, which will be useful in image processing and graphics operations, such as in the multi-media computing.

Multiprocessor integrated circuit 100 includes two random access memories. Random access memory 10 is primarily devoted to master processor 60. It includes two instruction cache memories 11 and 12, two data cache memories 13 and 14 and a parameter memory 15. These memory sections can be physically identical, but connected and used differently. Random access memory 20 may be accessed by master processor 60 and each of the digital image/graphics processors 71, 72, 73 and 74. Each digital image/graphics processor 71, 72, 73 and 74 has five corresponding memory sections. These include an instruction cache memory, three data memories and one parameter memory. Thus digital image/graphics processor 71 has corresponding instruction cache memory 21, data memories 22, 23, 24 and parameter memory 25; digital image/graphics processor 72 has corresponding instruction cache memory 26, data memories 27, 28, 29 and parameter memory 30; digital image/graphics processor 73 has corresponding instruction cache memory 31, data memories 32, 33, 34 and parameter memory 35; and digital image/graphics processor 74 has corresponding instruction cache memory 36, data memories 37, 38, 39 and parameter memory 40. Like the sections of random access memory 10, these memory sections can be physically identical but connected and used differently. Each of these memory sections of memories 10 and 20 preferably includes 2K bytes, with a total memory within multiprocessor integrated circuit 100 of 50K bytes.

Multiprocessor integrated circuit 100 is constructed to provide a high rate of data transfer between processors and memory using plural independent parallel data transfers. Crossbar 50 enables these data transfers. Each digital image/graphics processor 71, 72, 73 and 74 has three memory ports that may operate simultaneously each cycle. An instruction port (I) may fetch 64 bit data words from the corresponding instruction cache. A local data port (L) may read a 32 bit data word from or write a 32 bit data word into the data memories or the parameter memory corresponding to that digital image/graphics processor. A global data port (G) may read a 32 bit data word from or write a 32 bit data word into any of the data memories or the parameter memories or random access memory 20. Master Processor 60 includes two memory ports. An instruction port (I) may fetch a 32 bit instruction word from either of the instruction caches 11 and 12. A data port (C) may read a 32 bit data word from or write a 32 bit data word into data caches 13 or 14, parameter memory of random access memory 10 or any of the data memories, the parameter memories or random access memory 20. Transfer controller 80 can access any of the sections of random access memory 10 or 20 via data port (C). Thus fifteen parallel memory accesses may be requested at any single memory cycle. Random access memories 10 and 20 are divided into 25 memories in order to support so many parallel accesses.

Crossbar 50 controls the connections of master processor 60, digital image/graphics processors 71, 72, 73 and 74, and transfer controller 80 with memories 10 and 20. Crossbar 50 includes a plurality of crosspoints 51 disposed in rows and columns. Each column of crosspoints 51 corresponds to a single memory section and a corresponding range of addresses. A processor requests access to one of the memory sections through the most significant bits of an address output by that processor. This address output by the processor travels along a row. The crosspoint 51 corresponding to the memory section having that address responds either by granting or denying access to the memory section. If no other processor has requested access to that memory section during the current memory cycle, then the crosspoint 51 grants access by coupling the row and column. This supplies the address to the memory section. The memory section responds by permitting data access at that address. This data access may be either a data read operation or a data write operation.

If more than one processor requests access to the same memory section simultaneously, then crossbar 50 grants access to only one of the requesting processors. The crosspoints 51 in each column of crossbar 50 communicate and grant access based upon a priority hierarchy. If two requests for access having the same rank occur simultaneously, then crossbar 50 grants access on a round robin basis, with the processor last granted access having the lowest priority. Each granted access lasts as long as needed to service the request. The processors may change their addresses every memory cycle, so crossbar 50 can change the interconnection between the processors and the memory sections on a cycle by cycle basis.

Master processor 60 preferably performs the major control functions for multiprocessor integrated circuit 100. Master processor 60 is preferably a 32 bit reduced instruction set computer (RISC) processor including a hardware floating point calculation unit. According to the RISC architecture, all accesses to memory are performed with load and store instructions and most integer and logical operations are performed on registers in a single cycle. The floating point calculation unit, however, will generally take several cycles to perform operations when employing the same register file as used by the integer and logical unit. A register score board ensures that correct register access sequences are maintained. The RISC architecture is suitable for control functions in image processing. The floating point calculation unit permits rapid computation of image rotation functions, which may be important to image processing.

Master processor 60 fetches instruction words from instruction cache memory 11 or instruction cache memory 12. Likewise, master processor 60 fetches data from either data cache 13 or data cache 14. Since each memory section includes 2K bytes of memory, there is 4K bytes of instruction cache and 4K bytes of data cache. Cache control is an integral function of master processor 60. As previously mentioned, master processor 60 may also access other memory sections via crossbar 50.

Figure 3:
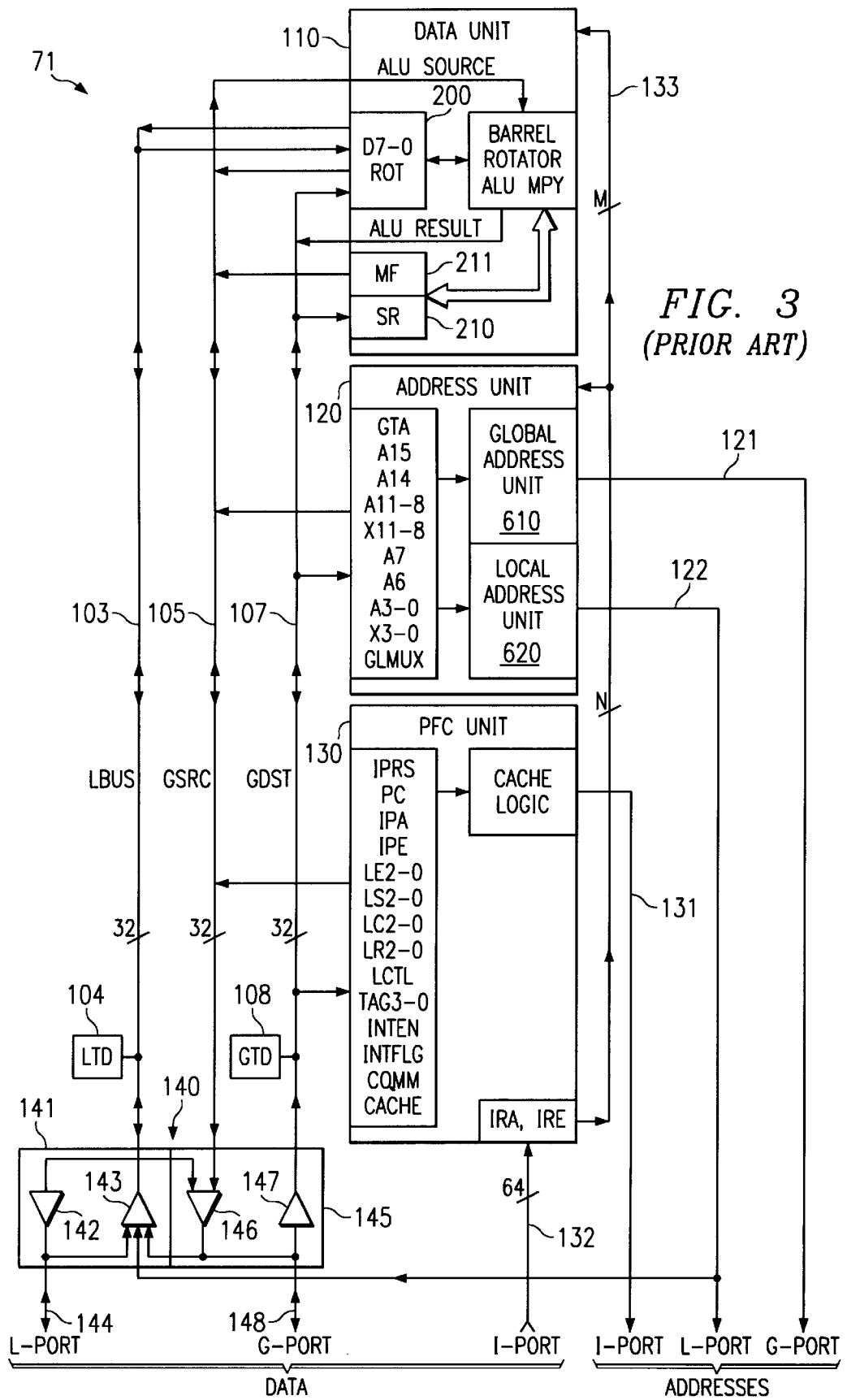
FIG. 3 illustrates in block diagram form one of the digital image/graphics processors illustrated in FIG. 2.

The four digital image/graphics processors 71, 72, 73 and 74 each have a highly parallel digital signal processor (DSP) architecture. FIG. 3 illustrates an overview of exemplary digital image/graphics processor 71, which is identical to digital image/graphics processors 72, 73 and 74. Digital image/graphics processor 71 achieves a high degree of parallelism of operation employing three separate units: data unit 110; address unit 120; and program flow control unit 130. These three units operate simultaneously on different instructions in an instruction pipeline. In addition each of these units contains internal parallelism.

The digital image/graphics processors 71, 72, 73 and 74 can execute independent instruction streams in the multiple instruction multiple data mode (MIMD). In the MIMD mode, each digital image/graphics processor executes an individual program from its corresponding instruction cache, which may be dependent or cooperative. In the latter case crossbar 50 enables inter-processor communication in combination with the shared memory. Digital image/graphics processors 71, 72, 73 and 74 may also operate in a synchronized MIMD mode. In the synchronized MIMD mode, the program control flow unit 130 of each digital image/graphics processor inhibits fetching the next instruction until all synchronized processors are ready to proceed. This synchronized MIMD mode allows the separate programs of the digital image/graphics processors to be executed in lock step in a closely coupled operation.

Digital image/graphics processors 71, 72, 73 and 74 can execute identical instructions on differing data in the single instruction multiple data mode (SIMD). In this mode a single instruction stream for the four digital image/graphics processors comes from instruction cache memory 21. Digital image/graphics processor 71 controls the fetching and branching operations and crossbar 50 supplies the same instruction to the other digital image/graphics processors 72, 73 and 74. Since digital image/graphics processor 71 controls instruction fetch for all the digital image/graphics processors 71, 72, 73 and 74, the digital image/graphics processors are inherently synchronized in the SIMD mode.

Transfer controller 80 is a combined direct memory access (DMA) machine and memory interface for multiprocessor integrated circuit 100. Transfer controller 80 intelligently sets priorities and services the data requests and cache misses of the five programmable processors. Master processor 60 and digital image/graphics processors 71, 72, 73 and 74 all access memory and systems external to multiprocessor integrated circuit 100 via transfer controller 80. Data cache or instruction cache misses are automatically handled by transfer controller 80. The cache service (S) port transmits such cache misses to transfer controller 80. Cache service port (S) reads information from the processors and not from memory. Master processor 60 and digital image/graphics processors 71, 72, 73 and 74 may request data transfers from transfer controller 80 as linked list packet requests. These linked list packet requests allow multidimensional blocks of information to be transferred between source and destination memory addresses, which can be within multiprocessor integrated circuit 100 or external to multiprocessor integrated circuit 100. Transfer controller 80 preferably also includes a refresh controller for dynamic random access memory (DRAM) which require periodic refresh to retain their data.

Frame controller 90 is the interface between multiprocessor integrated circuit 100 and external image capture and display systems. Frame controller 90 provides control over capture and display devices, and manages the movement of data between these devices and memory automatically. To this end, frame controller 90 provides simultaneous control over two independent image systems. These would typically include a first image system for image capture and a second image system for image display, although the application of frame controller 90 is controlled by the user. These image systems would ordinarily include independent frame memories used for either frame grabber or frame buffer storage. Frame controlled 90 preferably operates to control video dynamic random access memory (VRAM) through refresh and shift register control.

Multiprocessor integrated circuit 100 is designed for large scale image processing. Master processor 60 provides embedded control, orchestrating the activities of the digital image/graphics processors 71, 72, 73 and 74, and interpreting the results that they produce. Digital image/graphics processors 71, 72, 73 and 74 are well suited to pixel analysis and manipulation. If pixels are thought of as high in data but low in information, then in a typical application digital image/graphics processors 71, 72, 73 and 74 might well examine the pixels and turn the raw data into information. This information can then be analyzed either by the digital image/graphics processors 71, 72, 73 and 74 or by master processor 60. Crossbar 50 mediates inter-processor communication. Crossbar 50 allows multiprocessor integrated circuit 100 to be implemented as a shared memory system. Message passing need not be a primary form of communication in this architecture. However, messages can be passed via the shared memories. Each digital image/graphics processor, the corresponding section of crossbar 50 and the corresponding sections of memory 20 have the same width. This permits architecture flexibility by accommodating the addition or removal of digital image/graphics processors and corresponding memory modularly while maintaining the same pin out.

In the preferred embodiment all parts of multiprocessor integrated circuit 100 are disposed on a single integrated circuit. In the preferred embodiment, multiprocessor integrated circuit 100 is formed in complementary metal oxide semiconductor (CMOS) using feature sizes of 0.6 $\mu$m. Multiprocessor integrated circuit 100 is preferably constructed in a pin grid array package having 256 pins. The inputs and outputs are preferably compatible with transistor-transistor logic (TTL) logic voltages. Multiprocessor integrated circuit 100 preferably includes about 3 million transistors and employs a clock rate of 50 MHZ.

FIG. 3 illustrates an overview of exemplary digital image/graphics processor 71, which is virtually identical to digital image/graphics processors 72, 73 and 74. Digital image/graphics processor 71 includes: data unit 110; address unit 120; and program flow control unit 130. Data unit 110 performs the logical or arithmetic data operations. Data unit 110 includes eight data registers D7-D0, a status register 210 and a multiple flags register 211. Address unit 120 controls generation of load/store addresses for the local data port and the global data port. As will be further described below, address unit 120 includes two virtually identical addressing units, one for local addressing and one for global addressing. Each of these addressing units includes an all "0" read only register enabling absolute addressing in a relative address mode, a stack pointer, five address registers and three index registers. The addressing units share a global bit multiplex control register used when forming a merging address from both address units. Program flow control unit 130 controls the program flow for the digital image/graphics processor 71 including generation of addresses for instruction fetch via the instruction port. Program flow control unit 130 includes; a program counter PC 701; an instruction pointer-address stage IRA 702 that holds the address of the instruction currently in the address pipeline stage; an instruction pointer-execute stage IRE 703 that holds the address of the instruction currently in the execute pipeline stage; an instruction pointer-return from subroutine IPRS 704 holding the address for returns from subroutines; a set of registers controlling zero overhead loops; four cache tag registers TAG3-TAG0 collectively called 708 that hold the most significant bits of four blocks of instruction words in the corresponding instruction cache memory.

Digital image/graphics processor 71 operates on a three stage pipeline as illustrated in FIG. 4. Data unit 110, address unit 120 and program flow control unit 130 operate simultaneously on different instructions in an instruction pipeline. The three stages in chronological order are fetch, address and execute. Thus at any time, digital image/graphics processor 71 will be operating on differing functions of three instructions. The phrase pipeline stage is used instead of referring to clock cycles, to indicate that specific events occur when the pipeline advances, and not during stall conditions.

Program flow control unit 130 performs all the operations that occur during the fetch pipeline stage. Program flow control unit 130 includes a program counter, loop logic, interrupt logic and pipeline control logic. During the fetch pipeline stage, the next instruction word is fetched from memory. The address contained in the program counter is compared with cache tag registers to determine if the next instruction word is stored in instruction cache memory 21. Program flow control unit 130 supplies the address in the program counter to the instruction port address bus 131 to fetch this next instruction word from instruction cache memory 21 if present. Crossbar 50 transmits this address to the corresponding instruction cache, here instruction cache memory 21, which returns the instruction word on the instruction bus 132. Otherwise, a cache miss occurs and transfer controller 80 accesses external memory to obtain the next instruction word. The program counter is updated. If the following instruction word is at the next sequential address, program control flow unit 130 post increments the program counter. Otherwise, program control flow unit 130 loads the address of the next instruction word according to the loop logic or software branch. If the synchronized MIMD mode is active, then the instruction fetch waits until all the specified digital image/graphics processors are synchronized, as indicated by sync bits in a communications register.

Address unit 120 performs all the address calculations of the address pipeline stage. Address unit 120 includes two independent address units, one for the global port and one for the local port. If the instruction calls for one or two memory accesses, then address unit 120 generates the address(es) during the address pipeline stage. The address (es) are supplied to crossbar 50 via the respective global port address bus 121 and local port address bus 122 for contention detection/prioritization. If there is no contention, then the accessed memory prepares to allow the requested access, but the memory access occurs during the following execute pipeline stage.

Data unit 110 performs all of the logical and arithmetic operations during the execute pipeline stage. All logical and arithmetic operations and all data movements to or from memory occur during the execute pipeline stage. The global data port and the local data port complete any memory accesses, which are begun during the address pipeline stage, during the execute pipeline stage. The global data port and the local data port perform all data alignment needed by memory stores, and any data extraction and sign extension needed by memory loads. If the program counter is specified as a data destination during any operation of the execute pipeline stage, then a delay of two instructions is experienced before any branch takes effect. The pipelined operation requires this delay, since the next two instructions following such a branch instruction have already been fetched. According to the practice in RISC processors, other useful instructions may be placed in the two delay slot positions.

Digital image/graphics processor 71 includes three internal 32 bit data busses. These are local port data bus Lbus 103, global port source data bus Gsrc 105 and global port destination data bus Gdst 107. These three buses interconnect data unit 110, address unit 120 and program flow control unit 130. These three buses are also connected to a data port unit 140 having a local port 141 and global port 145. Data port unit 140 is coupled to crossbar 50 providing memory access.

Local data port 141 has a buffer 142 for data stores to memory. A multiplexer/buffer circuit 143 loads data onto Lbus 103 from local port data bus 144 from memory via crossbar 50, from a local port address bus 122 or from global port data bus 148. Local port data bus Lbus 103 thus carries 32 bit data that is either register sourced (stores) or memory sourced (loads). Advantageously, arithmetic results in address unit 120 can be supplied via local port address bus 122, multiplexer buffer 143 to local port data bus Lbus 103 to supplement the arithmetic operations of data unit 110. This will be further described below. Buffer 142 and multiplexer buffer 143 perform alignment and extraction of data. Local port data bus Lbus 103 connects to data registers in data unit 110. A local bus temporary holding register LTD 104 is also connected to local port data Lbus 103.

Global port source data bus Gsrc 105 and global port destination data bus Gdst 107 mediate global data transfers. These global data transfers may be either memory accesses, register to register moves or command word transfers between processors. Global port source data bus Gsrc 105 carries 32 bit source information of a global port data transfer. The data source can be any of the registers of digital image/graphics processor 71 or any data or parameter memory corresponding to any of the digital image/graphics processors 71, 72, 73 or 74. The data is stored to memory via the global port 145. Multiplexer buffer 146 selects lines from local port data Lbus 103 or global port source data bus Gsrc 105, and performs data alignment. Multiplexer buffer 146 writes this data onto global port data bus 148 for application to memory via crossbar 50. Global port source data bus Gsrc 105 also supplies data to data unit 110, allowing the data of global port source data bus Gsrc 105 to be used as one of the arithmetic logic unit sources. This latter connection allows any register of digital image/graphics processor 71 to be a source for an arithmetic logic unit operation.

Global port destination data bus Gdst 107 carries 32 bit destination data of a global bus data transfer. The destination is any register of digital image/graphics processor 71. Buffer 147 in global port 145 sources the data of global port destination data bus Gdst 107. Buffer 147 performs any needed data extraction and sign extension operations. This buffer 115 operates if the data source is memory, and a load is thus being performed. The arithmetic logic unit result serves as an alternative data source for global port destination data bus Gdst 107. This allows any register of digital image/graphics processor 71 to be the destination of an arithmetic logic unit operation. A global bus temporary holding register GTD 108 is also connected to global port destination data bus Gdst 107.

Circuitry including multiplexer buffers 143 and 146 connect between global port source data bus Gsrc 105 and global port destination data bus Gdst 107 to provide register to register moves. This allows a read from any register of digital image/graphics processor 71 onto global port source data bus Gsrc 105 to be written to any register of digital image/graphics processor 71 via global port destination data bus Gdst 107.

Note that it is advantageously possible to perform a load of any register of digital image/graphics processor 71 from memory via global port destination data bus Gdst 107, while simultaneously sourcing the arithmetic logic unit in data unit 110 from any register via global port source data bus Gsrc 105. Similarly, it is advantageously possible to store the data in any register of digital image/graphics processor 71 to memory via global port source data bus Gsrc 105, while saving the result of an arithmetic logic unit operation to any register of digital image/graphics processor 71 via global port destination data bus Gdst 107. The usefulness of these data transfers will be further detailed below.

Program flow control unit 130 receives the instruction words fetched from instruction cache memory 21 via instruction bus 132. This fetched instruction word is advantageously stored in two 64 bit instruction registers designated instruction register-address stage IRA 751 and instruction register-execute stage IRE 752. Each of the instruction registers IRA and IRE have their contents decoded and distributed. Digital image/graphics processor 71 includes opcode bus 133 that carries decoded or partially decoded instruction contents to data unit 110 and address unit 120. As will be later described, an instruction word may include a 32 bit, a 15 bit or a 3 bit immediate field. Program flow control unit 130 routes such an immediate field to global port source data bus Gsrc 105 for supply to its destination.

Digital image/graphics processor 71 includes three address buses 121, 122 and 131. Address unit 120 generates addresses on global port address bus 121 and local port address bus 122. As will be further detailed below, address unit 120 includes separate global and local address units, which provide the addresses on global port address bus 121 and local port address bus 122, respectively. Note that local address unit 620 may access memory other than the data memory corresponding to that digital image/graphics processor. In that event the local address unit access is via global port address bus 121. Program flow control unit 130 sources the instruction address on instruction port address bus 131 from a combination of address bits from a program counter and cache control logic. These address buses 121, 122 and 131 each carry address, byte strobe and read/write information.

Figure 5:
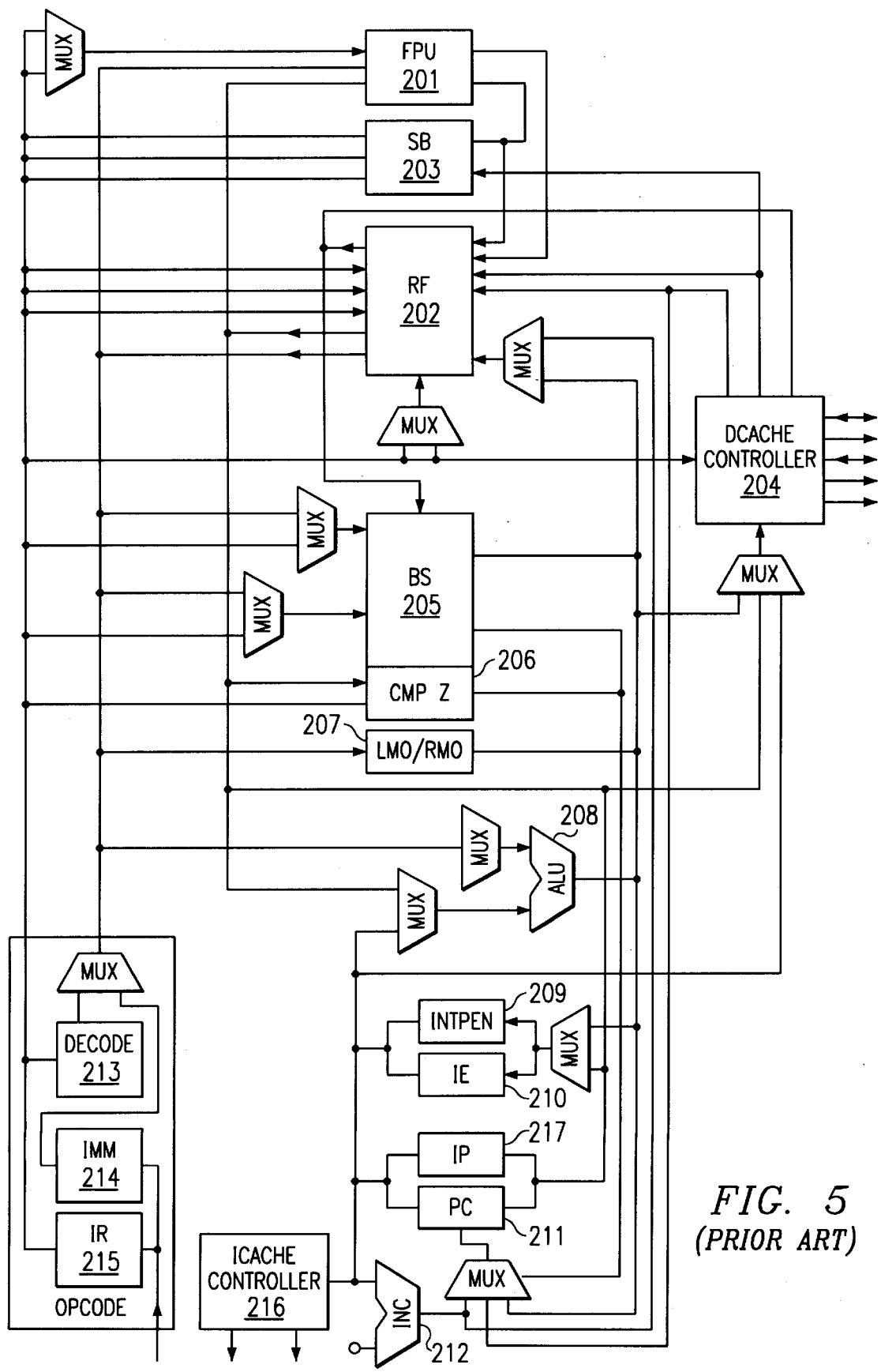
FIG. 5 illustrates the architecture of the master processor in the preferred embodiment of this invention.

FIG. 5 shows a simplified diagram of master processor 60. Major blocks of master processor 60 are: a floating point unit (FPU) 201; a register file (RF) 202; a register scoreboard (SB) 203 that ensures results of floating point operations and memory loads are available before they are used as sources and arbitrates between data cache and floating point unit 201 for access to their shared write port to register file 202; a data cache controller 204 which also handles the interface to the on-chip memory via the crossbar and to external memory via transfer processor 80; a barrel shifter (BS) 205 that performs shift instructions; compare to zero logic 206; left most one/right most one detection logic (LMO/RMO) 207; integer arithmetic logic unit (ALU) 208 used for add, subtract and logical operations and to compute branch target address during relative branches; interrupt pending register (INTPEN) 209 that receives master processor interrupt signals; interrupt enable register (IE) 210 that selectively enables or disables interrupts; program counter register (PC) 211 holds the address of the instruction to be fetched; program counter incrementer (INC) 212 that increments program counter 211 to point to the next instruction, with the incremented value can also be routed to the register file as a "return " or "link " address; instruction decode logic (DECODE) 213 that decodes instruction and supplies control signals to the operating units; instruction register (IR) 214 that holds the address of the instruction being executed; immediate register (IMM) 215 that stores any instruction immediate data; and the instruction cache controller (ICACHE) 216, that provides instructions to be executed, interfaces to transfer processor 80 for cache fills.

FIG. 6 shows the basic pipeline used in master processor 60. Master processor 60 has a three stage pipeline including fetch, execute and memory stages. FIG. 6 shows how three instructions through the pipeline. During the fetch stage of the pipeline program counter 210 is used to address the instruction cache and read a 32 bit instruction. During the execute stage the instruction is decoded, the source operands read from the register file, the operation performed, and a result written back to the register file. The memory stage is only present for load and store operations. The address calculated during the execute stage is used to address the data cache and the data are read or written. If a miss occurs on the instruction cache, the fetch and execute pipelines are stalled until the request can be serviced. If a miss occurs on the data cache, the memory pipeline stalls, but the fetch and execute pipelines continue to flow, until another memory operation needs to be initiated.

FIG. 7 shows the basic pipeline for floating point unit 201. The fetch stage is the same as the fetch stage of integer operations previously described. During the unpack stage of a floating point instruction, all data necessary to begin the floating point operation arrives including source operands, opcode, precisions and destination address. The two source operands are read from the register file. Operands are then unpacked into sign, exponent, mantissa fields and the detection of special cases takes place. Input exceptions are detected in this cycle. And input exceptions will be piped through floating point unit 201 and will be signaled on the same cycle as a single precision output exception. The other special cases involving signaling not-a-number, quiet not-a-number, infinity, denormal, and zero, are also detected and this information, which is not visible to user, will follow the data through the different pipeline stages of floating point unit 201.

All computation takes place during the operate stage. Depending on the type of instruction, several cycles in the operate stage may be required.

Output exceptions are detected in the final normalize stage. When floating point unit 201 result is determined, some of the individual information about this floating point operation is recorded in a floating point status register. Any floating point instruction writes to the floating point status register once and only once.

Figure 8:
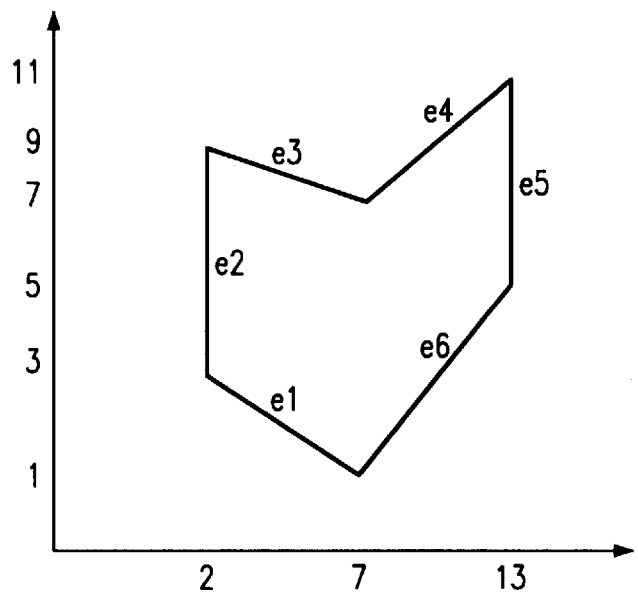
FIG. 8 illustrates an example polygon used to illustrate the operation of a prior art scan conversion technique.
Figure 9:
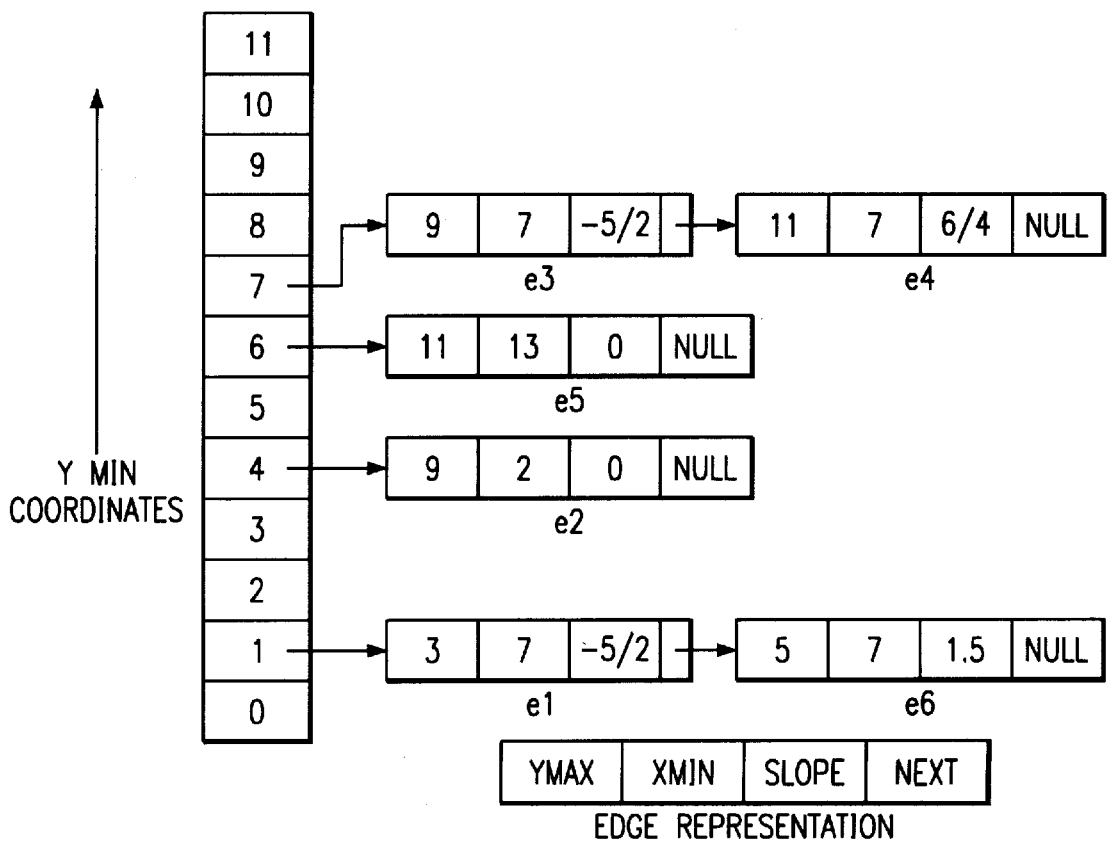
FIG. 9 schematically illustrates a edge table corresponding to the example polygon illustrated in FIG. 8.

FIG. 8 illustrates an example polygon, which will be used to illustrate the operation of a known scan conversion method. This polygon includes edges e1, e2, e3, e4, e5 and e6. FIG. 8 further illustrates scan lines 1 to 11 and pixel positions within each scan line 2, 7 and 13. The addition of edges to active edge table is done by maintaining an edge table (ET) containing all edges sorted by their minimum Y coordinate. FIG. 9 is an example edge table 300 for the polygon illustrated in FIG. 8. As illustrated in FIG. 9, the edges are sorted by minimum Y coordinate Ymin. Edge table 300 is formed as a set of linked lists. Scan line table 301 includes one entry for each scan line, in this example scan lines 0 to 11. If there is no edge having its Ymin on a scan line, then that scan line entry in table 301 stores a null value. In this example, the scan line table 301 entries for scan lines 0, 2, 3 and 8 to 11 store null values. If at least one edge has a Ymin corresponding to an entry in scan line table 301, then that entry stores an address pointer to an edge entry. As illustrated at example edge entry 320, each edge entry includes four fields: Ymax; Xmin; Slope; and a Next pointer. Both edges e1 and e6 have their Ymin on scan line 1. As illustrated schematically in FIG. 9, the entry in scan line table 301 for scan line 1 includes an address pointer pointing to edge entry 303 for edge e1. The Next field of edge entry 303 points to edge entry 305 corresponding to edge e6. Note that edge e6 is the last edge having its Ymin on scan line 1. Therefore the Next field of edge field 305 holds a null value. In a similar fashion, FIG. 9 illustrates that scan line table 301 has: an entry for scan line 4 pointing to edge entry 307 corresponding to edge e2; an entry for scan line 6 pointing to edge entry 309 corresponding to edge e5; and an entry for scan line 9 pointing to the chain of edge entry 311 corresponding to edge e3 and edge entry 313 corresponding to edge e4. Note that in edge table 300 of FIG. 9, edges e2 and e5 are shortened by one scan line to avoid duplicating intersections.

Figure 10:
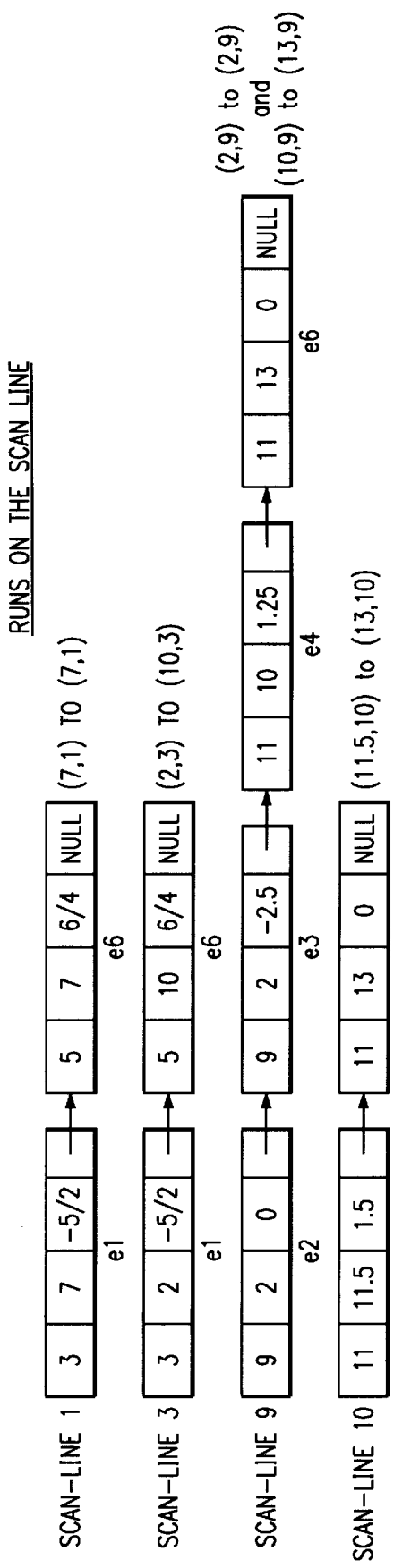
FIG. 10 schematically illustrates an active edge table corresponding to the example polygon illustrated in FIG. 8.

FIG. 10 illustrates the active edge table (AET) for the polygon illustrated in FIG. 8 at selected scan lines. At scan line 1 the active edges are e1 and e6 and these edges cover the range from (7,1) to (7,1). At scan line 3 the active edges are e1 and e6 and these edges cover a range from (2,3) to (10,3). At scan line 9 the active edges are edges e2, e3, e4 and e5 and these edges cover a range from (2,9) to (2,9) and from (10,9) to (13,9). At scan line 10 the active edges are edges e4 and e5 and these edges cover a range from (11.5,10) to (13,10).

This prior art scan conversion technique employs the following steps:

Step 1: Form the edge table 300 storing edges in buckets corresponding to individual scan lines based on the edge Ymin values.

Step 2: Set Y equal to the smallest Y-coordinate which has an entry in the edge table.

Step 3: Initialize the active edge table to be empty.

Step 4: Repeat steps 4 to 8 for each scan line until entries of the active edge table and the edge table for that scan line have been considered.

Step 5: Copy the edges in the edge table 300 for the scan line Y into a corresponding active edge table maintaining the edge order on Xmin of the edges.

Step 6: Determine the fill runs on the scan line using the edge entry X-coordinates from the active edge table.

Step 7: Remove from the active edge table those edges where the scan line value equals the edge entry maximum Y value Ymax (Y=Ymax).

Step 8: For all other edge entries in the active edge table, update the X value. This is achieved by replacing the current X value with the sum of the current X value and the reciprocal of the Slope (X=X+1/m). Then re-sort by X the edge entries for that active edge table. This is needed because the slope updated edges may cross and become out-of-order in X.

Step 9: Increment the scan line value Y by 1 (Y=Y+1) to consider the next scan line.

Step 10: Repeat steps 3 to 9 for each scan line of the image to be converted.

This known scan conversion method has the following inefficiencies. Much of the sorting of active edge table is unnecessary. Sorting of the active edge table is needed only at edge intersections and vertices. In the example polygon illustrated in FIG. 8, only four sorting calls are needed. This is one for each vertex. The prior art scan conversion technique sorts each scan line. This is 10 times for this example. This inefficiency will be more pronounced in case of polygons with greater heights. Sorting is highly computational and consumes good amount of time.

The memory used to store the edge table and the active edge tables is not used efficiently. The edges are stored as buckets in a table. Such a table has a lot of empty spaces where there is no edge. The prior art memory structure fills these empty scan line entries with a null. Each edge is linked with the next edge through a pointer. Thus there are many pointers used in these tables. This representation is not suitable for processors having small on chip memory. If the polygon has a high number of edges, then the whole table may not fit within the on-chip cache memory. Thus there will be a lot of cache penalties for loading and reloading the tables. Lastly, forming the active edge table is time consuming. The active edge table uses a separate memory space in this prior art technique. The technique does not operate on data in place, but requires it to be moved repeatedly in forming the active edge table.

Figure 11:
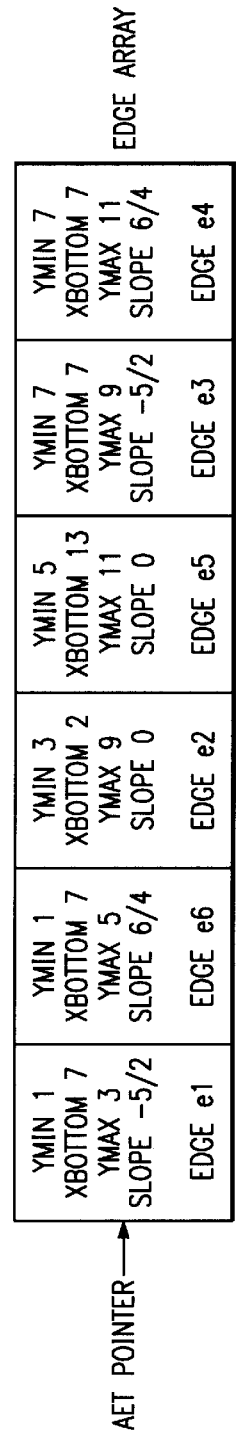
FIG. 11 schematically illustrates an edge array according to this invention for the example polygon illustrated in FIG. 8.

The polygon scan conversion technique of this invention provides improved memory use and reduced the execution time. In the technique of this invention the edges are stored in a single array called an edge array (EA). FIG. 11 illustrates edge array 400 of this invention for the example polygon illustrated in FIG. 8. Edge array 400 includes edge entry 401 corresponding to edge e1, edge entry 403 corresponding to edge e6, edge entry 405 corresponding to edge e2, edge entry 407 corresponding to edge e5, edge entry 409 corresponding to edge e3 and edge entry 411 corresponding to edge e4. Each edge entry 401, 403, 405, 407, 409 and 411 includes four fields: Ymin; Xbottom; Ymax; and Slope. These edge entries 401, 403, 405, 407, 409 and 411 are packed in memory and need no Next pointers. In a manner that will be detailed below, active edge table pointer 421 includes pointers to the edge entries 401, 403, 405, 407, 409 and 411 which are active in the current scan line and an edge count.

The polygon scan conversion technique of this invention employs the following steps:

Step 1: Form the edge array sorting the edges by Ymin and then by Ymax.

Step 2: Set Y to the lowest Ymin of the first entry in the edge array.

Step 3: Initialize the first entry in the active edge table pointer to the first entry in the edge array and an AET_count to 0.

Step 4: Repeat steps 5 to 14 until the active edge pointer is empty.

Step 5: Starting from the edge array entry pointed to by the active edge table pointer, set next active edge table pointer entry to point to next edge array entry and increment AET_count until finding an edge with different Ymin. The different Ymin is called next_Ymin. This sets AET_count to the number of active edges on the current scan line. Sort the active edge table pointer entries (equal in number to AET_count) based on these X values for the current scan line.

Step 6: Determine the active edge table pointer entries for the next scan line next_Ymin.

Step 7: If the entries in the active edge table pointer for next_Ymin are out of sort, then edges intersect between the current scan line Y and the next scan line next_Ymin. If so, determine the Y coordinates of these edge intersections and store them in an array intersect_Y_array. Sort this array in ascending X coordinate order. Set NumInters to the number of such edge intersections.

Step 8: For each detected edge intersection repeat steps 9 to 13 (NumInters number of times).

Step 9: For each edge intersection listed in the intersect_Y_array, sort the active edge table pointer by X coordinate. If there are no intersections, then go to step 13.

Step 10: Determine the fill runs on the scan line Y by using the pairs of X-coordinates from the active edge table pointer.

Step 11: For all other edge entries in the active edge table pointer, update the X value for next scan line by replacing the current X value with the sum of the current X value and the reciprocal of the Slope (X=X+1/m).

Step 12: Increment Y by 1 to refer to the next scan line.

Step 13: Remove those edges from the active edge table pointer whose Ymax equals the current Y value. Reset Ymin and return to step 4.

Figure 12A:
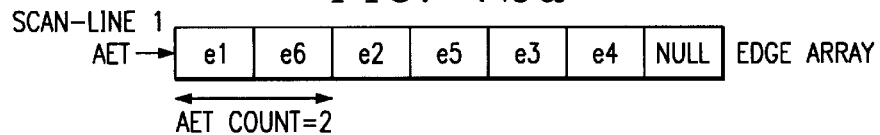
FIGS. 12a, 12b and 12c schematically illustrate the status of the active edge array table according to this invention for the example polygon illustrated in FIG. 8 for several example scan lines.
Figure 12B:
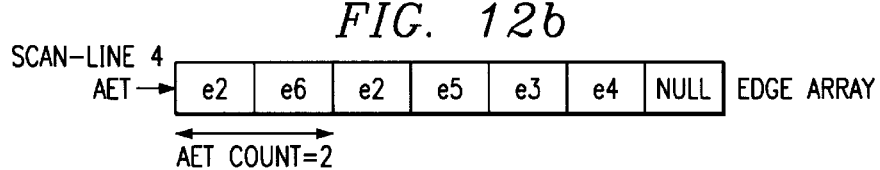
Figure 12C:
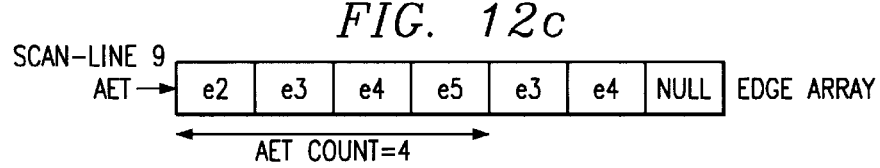

FIGS. 12a, 12b and 12c illustrate the state of the active edge table pointer 421 for a few of the scan lines of the example polygon illustrated in FIG. 8. Active edge table pointer 421 includes entries for each of the edges e1 to e6. These are initially sorted in the order of edge array 400 illustrated in FIG. 11. The final entry in active edge table pointer 421 is a null entry that signals the end of this table.

FIG. 12a illustrates that at scan line 1, only edges e1 and e6 are active. Thus the active edge table count AET_count is 2 as shown. According to the polygon scan conversion method of this invention detailed above, only edges e1 and e6 need be considered for scan line 1. Note that only the pointer entries spanned by the active edge table count AET_count are valid. The conversion technique does not consider other active edge table pointer entries so their contents are unimportant.

FIG. 12b illustrates that at scan line 4, edges e2 and e6 are active. Edge e1 is not active and is no more needed. However, edge e2 has become active. The pointers to the active edges need to be stored sequentially in the X value for the purpose of generating fill runs and sorting. Hence the pointer to edge e1 is removed and replace with the pointer to edge e2. Edge e6 remains active but is later in X than edge e2.

FIG. 12c illustrates that at scan line 9, edge e6 is not active. The active edges are edges e2, e3, e4 and e5. These four active edges set the active edge table count AET_count to 4 as shown. Pointers for the active edges e2, e3, e4 and e5 are copied in the first four places and sorted by X value.

From the above description, it should be clear that the active edge table pointed is sorted one only at edge intersections and vertices of the polygon. This contrasts to the prior art which sorted at every scan line. The edge array does not require an entry for each scan line, thus avoiding storing nulls as required by the prior art. The active edge table pointer includes mostly pointers to data within the edge array. This avoids duplication of data that was required in the prior art. In this invention the uses the data of the edge array in place without needing to duplicate the data.

This invention does require detection of edge intersections and this requires the extra computation. However, this extra computation takes place only between two vertex scan lines (vertex scan line is defined as a scan line that passes through a polygon vertex). Hence this step is executed minimal number of times. Note that edge intersections need to be tested for between two vertex scan line only if the elements in the Active edge table fall out of sort between the two vertex scan lines. Alternatively, one can scan convert every scan line between two vertex scan lines when the Active edge table falls out of sort (signaling the presence of an edge intersection between the scan lines). This avoids any edge intersection computations.

Below is the results of a simulation of this invention implemented in the programming language C on a SUN Sparc20 computer. Table 1 shows the performance observed on a Postscript file Tiger.ps.

TABLE 1

|  | Number of Polygons | Scan Conversion Time | Number of Insertion sort calls |
| --- | --- | --- | --- |
| Prior Art | 4780 | 0.76 sec | 188,493 |
| Invention | 4780 | 0.56 sec | 39,484 |

Table 2 shows the performance observes on a PostScript file Santabats.ps.

TABLE 2

|  | Number of Polygons | Scan Conversion Time | Number of Insertion sort calls |
| --- | --- | --- | --- |
| Prior Art | 5452 | 9.61 sec | 3,112,781 |
| Invention | 4780 | 5.23 sec | 263,803 |

Clearly, the proposed polygon scan conversion technique is faster than the existing technique. Most of the time savings are due to better memory organization and the reduced number of sorting calls.

Figure 13A:
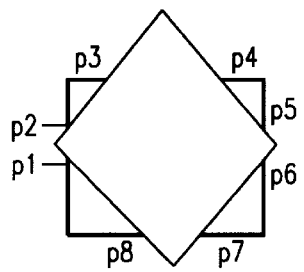
FIGS. 13a, 13b, 13c, 13d and 13e illustrate various intermediate stages in a prior art polygon clipping method.
Figure 13B:
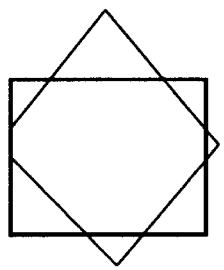

FIGS. 13a, 13b, 13c, 13d, 13e, 14 and 15 illustrate some prior art techniques for clipping polygons. FIG. 13 illustrates a technique called the Sutherland-Hodgman (S-H) method. FIG. 13a illustrates a square clip polygon and a diamond subject polygon. The Sutherland-Hodgman (S-H) method uses a re-entrant technique of sequentially cutting each edge of the subject polygon against a clip polygon edge. This is repeated for all edges of the clip polygon. This method clips the subject polygon edge with each edge of the clip polygon and accumulates the vertices. FIG. 13b shows accumulation of vertices p1 and p2 when clipping against the left edge.

Figure 13C:
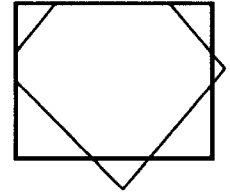
Figure 13E:
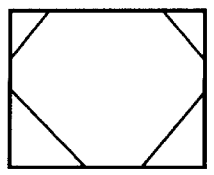
Figure 13D:
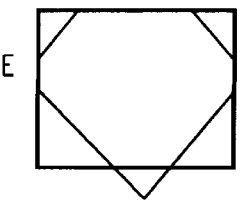

FIG. 13c shows accumulation of vertices p3 and p4 when clipping against the top edge. FIG. 13d shows accumulation of vertices p5 and p6 when clipping against the right edge. FIG. 13e shows accumulation of vertices p7 and p8 when clipping against the bottom edge. This method does not recognize the geometry that will be formed when a scan line at p1 is drawn intersecting the other edges. Hence, it cannot extract the trapezoids while clipping.

Figure 14:
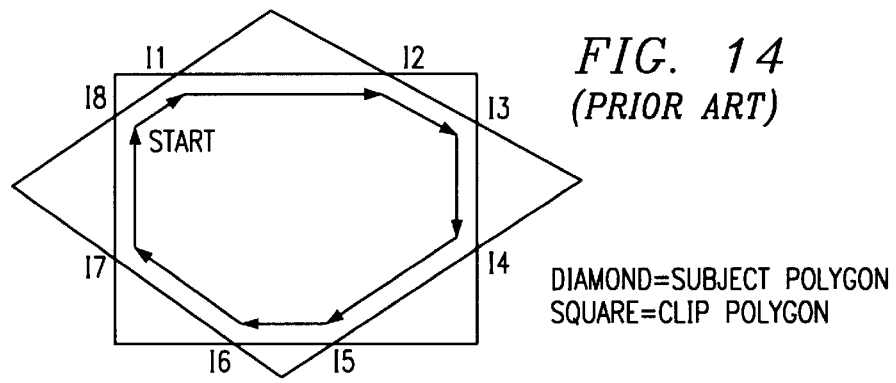
FIG. 14 illustrates another prior art polygon clipping method.

FIG. 14 illustrates a technique called the Weiler-Atherton (W-A) technique. The Weiler-Atherton (W-A) technique traverses along the boundary of subject polygon until it intersects the clip polygon. The method then takes a right turn and traverses along the clip polygon boundary until an intersection with subject polygon is found. The method then it takes another right turn and traverses along the subject polygon boundary. This process is repeated until the start point is encountered, at which point the clipping process is over. FIG. 14 illustrates one path from intersection I8 to I1, I2, I3, I4, I5, I6, I7 and back to I8. This process forms a new clipped polygon. The Weiler-Atherton (W-A) clipping technique uses the concept of traversing the boundaries of polygons by correctly entering and exiting at every intersection between the two polygons. Hence, this technique also does not have the scope of forming trapezoids at the same time as clipping.

Figure 15:
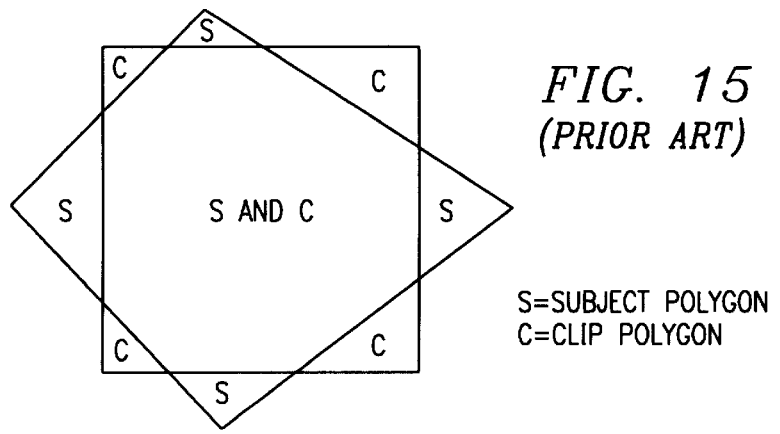
FIG. 15 illustrates a third prior art polygon clipping method.

FIG. 15 illustrates a technique called the Weiler-Polyline (WP) technique. The Weiler Polyline (WP) technique works by dividing the entire region of subject polygon and clip polygon into different disjoint regions and assigning them labels as belonging to subject only, clip only, subject and clip only, outside. The resulting clipped polygon is the regions marked subject and clip. The Weiler Polyline technique does not form a geometry permitting trapezoids extraction by drawing scan lines, finding intersects and grouping it with other vertices. The Weiler Polyline method only identifies the disjoint regions. Generating trapezoids corresponding to the intersection area between the clip and subject polygons cannot be done at the same time.

Figure 16:
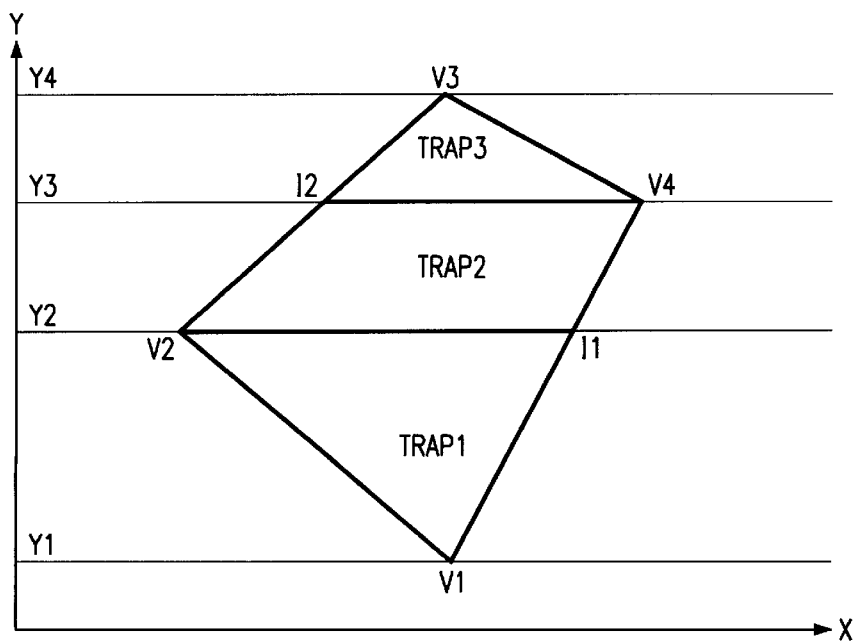
FIG. 16 illustrates a prior art trapezoid formation method.

FIG. 16 illustrates a prior art method of converting a polygon to trapezoids. Here the polygon is described by the four vertices V1, V2, V3 and V4. The polygon is converted into three trapezoids by drawing scan lines at every vertex. The line segment V2-I1 is drawn at vertices V2. The line segment V4-I2 is drawn at vertex V4. The resulting trapezoid, referred to as Trap1, Trap2 and Trap3 as shown in FIG. 16. The salient feature of this process is drawing a scan line at every vertex. This fixes the bottom and top scan lines for every trapezoid. As illustrated in FIG. 16, scan lines are drawn at Y=Y1 and Y=Y2 through the vertices V1 and V2 of the polygon. Then the intersection of Y2 with edge V1-V4 is found at I1. This defines trapezoid Trap1. As illustrated in FIG. 16, Trap1 is established between vertex V1, vertex V2 and the intersection I1. In a similar fashion, the intersection of the line as Y=Y1 with edge V2-V2 is found at I2. This defines trapezoid Trap2 by the vertices V2, I1, V4 and I2 and defines trapezoid Trap3 by the vertices V3, V4 and I2.

From the above descriptions of the prior art, it is clear that no prior method generates trapezoids while clipping two polygons. Therefore, a method which draws scan lines and then extracts the geometry between various vertices and intersections to form trapezoids is needed.

The technique of this invention integrates the process of clipping and trapezoid decomposition. The inventive technique drawings scan lines at every vertex and edge intersection of both clip polygon and subject polygon. Then trapezoids are formed in the interested region, that is the clipped area.

Figures 17, 18:
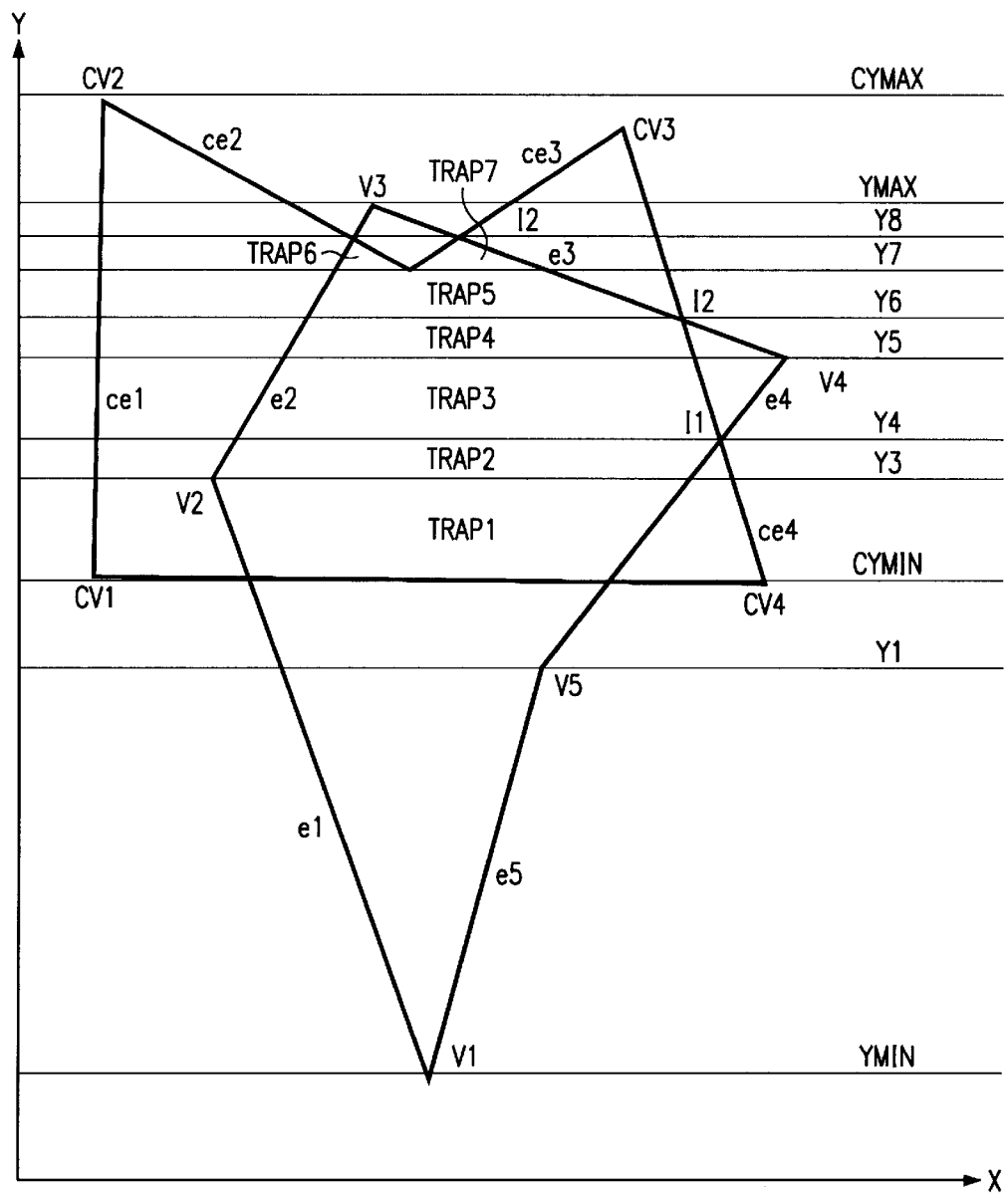
FIG. 17 illustrates an example subject polygon and clip polygon used in the description of the method to clip polygons and form trapezoids according to this invention.
FIG. 18 schematically illustrates the status of active edge tables for the subject and clip polygons during a first portion of an example of the method to clip polygons and form trapezoids according to this invention.

FIG. 17 illustrates an example subject polygon and clip polygon used in explanation of this invention. The subject polygon consists of edges e1, e2, e3, e4 and e5 and joining vertices V1, V2, V3, V4 and V4. The subject polygon has a minimum Y extent Ymin at vertex V1 and a maximum Y extent Ymax at vertex V3. Likewise, the clip polygon consists of edges ce1, ce2, ce3, ce4 and ce5 joining vertices CV1, CV2, CV3, CV4 and CV5. The clip polygon has a minimum Y extent CYmin at vertex CV4 and a maximum Y extent CYmax at vertex CV2.

Each edge of the subject polygon and the clip polygon is stored in a fixed format in a polygon sorted edge array. The data type and the amount of memory allocated according to this fixed format of the preferred embodiment is listed in Table 3.

TABLE 3

| Data | Size |
| --- | --- |
| Xbottom | 4 bytes |
| Ymin | 4 bytes |
| Ymax | 31 bits |
| Direction | 1 bit |
| Slope | 4 bytes |

Most of these data types are self explanatory. Note that either Xbottom and Ymin form one vertex or Xbottom and Ymax form one vertex. This is noted by the direction bit. The direction bit is "1"if the edge inclines upwards and is "0"if the edge inclines downwards. This direction information may also be used to determine if a point is inside or outside the polygon using the known winding rule or the known even-odd rule. The edges of the two polygons are stored in two separate arrays, one array for the subject polygon and one array for the clip polygon. Each of these arrays is sorted based on the edge minimum Y coordinate Ymin.

The result of the clipping and trapezoid determination will be a set of trapezoids. Each trapezoid has four sides, Xleft, Xright, Ybottom and Ytop. The edges Xleft and Xright are identified in the same fashion as described in Table 3. The edges Ybottom and Ytop are parallel to the scan direction and are identified by only their Y coordinate. The clipping and trapezoid determination begins at Y=0 and proceeds in increasing Y.

From FIG. 17, it can be easily found that the clipped area lies between scan lines CYmin and Ymax. Note that the clipped polygon will never extend below the greater of Ymin and CYmin nor extend above the lesser of Ymax and CYmax. In the example illustrated in FIG. 17, CYmin is greater than Ymin. Hence, the edges (only the edge e5) which lie below scan line CYmin are not considered for clipping. Thus CYmin is taken as the Ybottom for the first trapezoid. To fix the Ytop for the trapezoid, the next edge intersection/vertex is considered. The next vertex of the subject polygon V2 is at scan line Y3 and next vertex of the clip polygon is CV3 at Y7. Since Y3 is less than Y7, the Ytop of the first trapezoid is fixed at Y3. Note there are no intersections of edges of both polygons between scan lines at CYmin and Y3. The Xbottom fields of edges e1 and e4 are updated for the scan line CYmin using the following equation:

$$e1.Xbottom = e1.Xbottom + (CYMin - YMin) * e1.slope$$

$$e4.Xbottom = e4.Xbottom + (CYMin - Y1) * e4.slope$$

Next active edge tables (AET) are formed separately for both the polygons at scan line CYMin. Each active edge table lists edges which intersect the scan line CYMin. The active edge tables for the subject and clip polygons in this example are shown in FIG. 18. The active edge tables are then sorted based on their Xbottom field in an ascending order so that Xleft and Xright for a trapezoid are fixed correctly.

In the alternative, the active edge tables of clip and subject polygons can be merged into one list. In this case an additional field is needed in the edge data structure to determine whether the edge belongs to the subject polygon or to the clip polygon. This permits whether a region between two edges is inside both of the polygons.

As shown in FIG. 18, the subject polygon active edge table consists of edges e1 and e4 and the clip polygon active edge table consists of edges ce1 and ce4. The two active edge tables are sorted in the ascending order based on the Xbottom field. Next the first edges in the two active edge tables are compared. The edge having higher Xbottom is determined as the left edge Xleft of the trapezoid. In this example, the left edge Xleft of this first trapezoid is e1. The subject polygon active edge table pointer is advanced to the next edge e4. Since the edge ce1 lies to the left of edge e1 and outside the clip region, it cannot not form any edge of the common region between the two polygons. Thus in this example, the clip polygon active edge table pointer is advanced to the next edge ce4.

The right edge Xright of this first trapezoid can result be either a subject polygon edge or a clip polygon active edge. The Xbottoms of the two edges e4 and ce4 are compared. The minimum Xbottom identifies edge e4 as the right edge Xright of this first trapezoid. This completes consideration of all edges in the subject active edge table and marks the end of the trapezoid formation.

The region between these just determined Xleft, Xright, Ybottom and Ytop line segments in FIG. 17 is inside both the polygons. This inside determination can be confirmed based on the prior art winding number rule or the prior art even-odd rule. Thus the first Trap1 is formed between scan lines CYMin and Y3 as follows:

Trap1: Ybottom=CYMin
    Ytop=Y3
    Xleft=e1
    Xright=e4

Since the edge e1 of the subject polygon reaches its maximum Y at Y3, it is removed from the subject polygon active edge table. Edge e2 starting from Y3 is added to the subject polygon active edge table. Since the edges are already sorted based on Ymin field, edge e2 follows immediately after edges e1 and e5 in the subject polygon sorted edge array.

The Ybottom of the next trapezoid is Ytop of the previous trapezoid. Thus Trap2: Ybottom =Y3. The next scan line that can be drawn from the clip polygon is at vertex CV3 at scan line Y7. The next scan line that can be drawn from the subject polygon is at vertex V4 scan line Y5. In between FIG. 17 shows an edge intersection at I1 at scan line Y4. The minimum of Y4, Y5 and Y7, which is Y4, is determined as the Ytop for the next trapezoid. The above process of forming and traversing the active edge tables is repeated and the following trapezoids are formed:

Trap2: Ybottom=Y3
    Ytop=Y4
    Xleft=e2
    Xright=e4
Trap3: Ybottom=Y4
    Ytop=Y5
    Xleft=e2

Xright=ce4
Trap4: Ybottom=Y5
   Ytop=Y6
   Xleft=e2
   Xright=ce4
Trap5: Ybottom=Y6
   Ytop=Y7
   Xleft=e2
   Xright=e3

Figure 19:
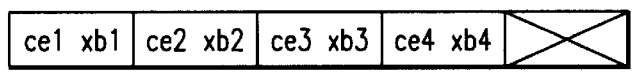
FIG. 19 schematically illustrates the status of active edge tables for the subject and clip polygons during a second portion of the example of the method to clip polygons and form trapezoids according to this invention.
Figure 19:
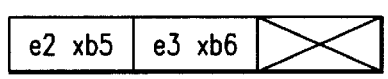

FIG. 19 illustrates the status of the subject and clip polygon active edge tables between scan lines Y7 and Y8. The subject polygon active edge table consists of edges e2 and e3. The clip polygon active edge table consists of edges ce1, ce2, ce3 and ce4. The edges ce2 and ce3 have equal Xbottom values. Hence, the ascending order of these two edges is determined based on the edge having lesser. Between edges e2 and ce1, the region is not common to both polygons. Hence edge ce1 is discarded and the clip polygon active edge table pointer is moved to edge ce2. The Xleft is determined as edge e2 and subject polygon active edge table pointer is moved to edge e3. To find the Xright of the trapezoid, e3 and ce2 are considered. Since the Xbottom of ce2 is less than that of e3, Xright is determined as ce2 and clip polygon active edge table pointer is moved to edge ce3.

The region between Xleft=e2 and Xright=ce2 is common for both subject and clip polygons. Hence a trapezoid is formed as follows.
   Trap6: Ybottom=Y7
      Ytop=Y8
      Xleft=e2
      Xright=ce2

Because neither active edge table pointer has reached its end, more trapezoids can be formed between scan lines Y7 and Y8. Here the subject polygon active edge table points to e3 and clip polygon active edge table points to ce3. Since the Xbottom of edge ce3 is less than that of edge e3, the Xleft of this trapezoid is determined as ce3 and clip polygon active edge table pointer is moved to edge ce4. The Xbottoms of edge e3 and edge ce4 are considered to determine the Xright of the trapezoid. Since the Xbottom of edge e3 is less than that of ce4, Xright is determined as e3 and the clip polygon active edge table pointer reaches its end. The region between edges ce3 and e3 is common to both the polygons. Hence the final trapezoid is formed as follows:
   Trap7: Ybottom=Y7
      Ytop=Y8
      Xleft=ce3
      Xright=e3

The general form of this technique is described in the steps below:
   Step 1: Form edge arrays for the subject and clip polygons. Sort the edges on increasing Ymin field. If two edges have equal Ymin value, then sort these edges based on the slope.
   Step 2 Compare the Ymin fields of the first edged of the two polygons. Select the greatest of these as Ybottom, the bottom scan line of the next trapezoid to be formed.
   Step 3: If Ybottom belongs to the clip polygon, discard any edges of the subject polygon having a Ymax field less than Ybottom.
   Step 4: If Ybottom belongs to the subject polygon, discard any edges of the clip polygon having a Ymax field less than Ybottom.
   Step 5: Find the next Ymin of the two polygons. These points are where a new edge joins or an old edge ends. Set Ytop for this trapezoid to be the minimum of the next Ymin of the subject polygon and the next Ymin of the clip polygon.
   Step 6: Since Ymax is the maximum Y value of the subject polygon, none of the clipped polygon can have a greater Y value. If Ytop is greater than Ymax, then clipping and trapezoid formation are complete.
   Step 7: Form the active edge table of both the subject and clip polygons at Ybottom. Update the Xbottom fields for scan line Y bottom. Sort both active edge tables based on the Xbottom value in ascending order. If Xbottoms are equal then sort based on the slope values.
   Step 8: Find if there are any edge intersections between Ybottom and Ytop. These edge intersections might be between the edges of subject polygon itself, between edges of clip polygon itself or between the edges of clip and subject polygons. Let the number of these intersections be N. Store the Y coordinates of these intersections in an array intersectY and sort in ascending order.
   Step 9: Store Ytop as the N-th element in intersectY array and increment N by 1. Ytop will be the last element in intersectY as all the edge intersections are below Ytop.
   Step 10: Consider the next edge entry in the subject polygon active edge table and the clip polygon active edge table. Discard the entry having the smaller Xbottom. This discards any candidate left edge that is definitely out of clip region. If the Xbottom values are equal, then discard one entry based on the slope values.
   Step 11: For all edge intersections/vertex Y values in intersectY array repeat steps 12 to 18.
   Step 12: For all the edges in the active edge table of both the subject and clip polygons repeat steps 13 to 19.
   Step 13: If the Xbottom value of the next edge in the subject polygon active edge table is less than the Xbottom value of the next edge in the clip polygon active edge table, then tentatively set Xleft equal to the next subject polygon edge.
   Step 14: If the Xbottom value of the next edge in the subject polygon active edge table is greater than the Xbottom value of the next edge in the clip polygon active edge table, then tentatively set Xleft equal to the next clip polygon edge.
   Step 15: If the Xbottom value of the next edge in the subject polygon active edge table is less than the Xbottom value of the next edge in the clip polygon active edge table, then tentatively set Xright equal to the next subject polygon edge.
   Step 16: If the Xbottom value of the next edge in the subject polygon active edge table is greater than the Xbottom value of the next edge in the clip polygon active edge table, then tentatively set Xright equal to the next clip polygon edge.
   Step 17: If the region between Xleft and Xright is inside both polygons, the output a trapezoid with edges Xleft, Xright, Ybottom and Ytop.
   Step 18: If either subject or clip polygon active edge table reaches the end of its list, then go to step 11 or else go to step 13.
   Step 19: Remove those edges from both the active edge tables if their Ymax is equal to Ytop. For the rest of the edges in both active edge tables, update the Xbottom fields of the edges to be at scan line Ytop. Update Ybottom to be Ytop.

Step 20: Return to step 5.

Edge intersections can be found using the known line intersection procedure or using the known mid-point subdivision method to find the Y coordinate where two edges intersect. The mid-point subdivision method is advantageously used on a fixed point processor.

The above method can easily be extended to generate the trapezoids of the common regions between N polygons. The technique is similar to the two polygon clipping and trapezoid generation. The edges of each polygon are stored in separate edge arrays. For each polygon a separate active edge table and a separate winding number sum is maintained. The trapezoid left edge and right edge are generated by traversing across the plural active edge tables. Whenever a region between XLEFT edge and XRIGHT edge is inside of all N polygons, a trapezoid is generated. Generation of trapezoids between two transition lines is complete upon reaching the end of a single active edge table. The clipping process is over when the YBOTTOM scan line is greater than the minimum of all Ymax values of N polygons.

The clipping process of this invention takes a new approach of clipping based on scan lines. Trapezoid decomposition of the clipped polygon is built into the clipping process. This reduces the code length for this process. Thus this technique is faster than the prior art approach of clipping first and then decomposing the resultant polygon into trapezoids. Table 4 gives the estimated code size to implement this process on one of the digital image/graphics processors 71, 72, 73 and 74 of multiprocessor integrated circuit 100.

TABLE 4

|  | Clipping only | Trapezoid Decomposition only | Combined Clipping and Trapezoid Decomposition |
|---|---|---|---|
| C code | 300 | 250 | 400 |
| Native instructions | 450 | 375 | 600 |

The proposed method can be used to achieve parallelization of the PostScript Interpreter on multiprocessor integrated circuit 100 as a subtask. This method is suitable for high performance PostScript page rasterization because in many graphics page descriptions it is common to have one clip polygon to clip against many subject polygons. this method suits a processor having limited on chip memory and limited instruction cache memory. This is because there is no need to form the clipped polygon, store it in external memory, then recall it from external memory and decompose the polygon to trapezoids. The edge arrays themselves can be used as the active edge tables, reducing the amount of memory needed. The method is simple to implement and does not involve any complicated data structures. The method can process any types of polygons including concave, convex, self intersecting and polygons with inside holes. Since this method operates on sorted edge arrays, edge intersection computations are done only on the edges between two scan lines. This makes the edge intersection computations local to the clipping process and no prior computation of all edge interactions is needed.

As pointed out above processing of a page description language interpretation. The master processor 60 is well suited for interpretation tasks while the digital image/graphics processors 71, 72, 73 and 74 are well suited for rasterization. However, it has been found that interpretation is the bottleneck. Certain tasks in interpreter can be executed in parallel on the digital image/graphics processors 71, 72, 73 and 74, like path to trapezoid decomposition, color conversion, curve flattening and font conversion. The path-to-trapezoid decomposition routine can be split further into at least two subtasks, namely sorting and decomposition, which can be pipelined and executed in parallel on different the digital image/graphics processors 71, 72, 73 and 74. Hence, the multiprocessor environment of multiprocessor integrated circuit 100 can be exploited to save computational time on master processor 60 and parallelize the interpreter.

Decomposition of polygons into trapezoids is a step in triangulation of polygons in the known art. The path to trapezoid technique proposed is based on edge-coherence in which the path is specified in terms of edges. Essentially, pixels at a particular scan line are to be filled if they lie on the inside of the path. Determining the insideness of a given pixel on a scan line can be done by determining what and how many edges intersect that scan line. The procedure is simplified because an edge intersecting scan line i is likely to also intersect scan line i+1. This is property is termed edge coherence. In the proposed method, conversion of the path to trapezoids, or trap cutting is based on similar concepts.

Figure 20:
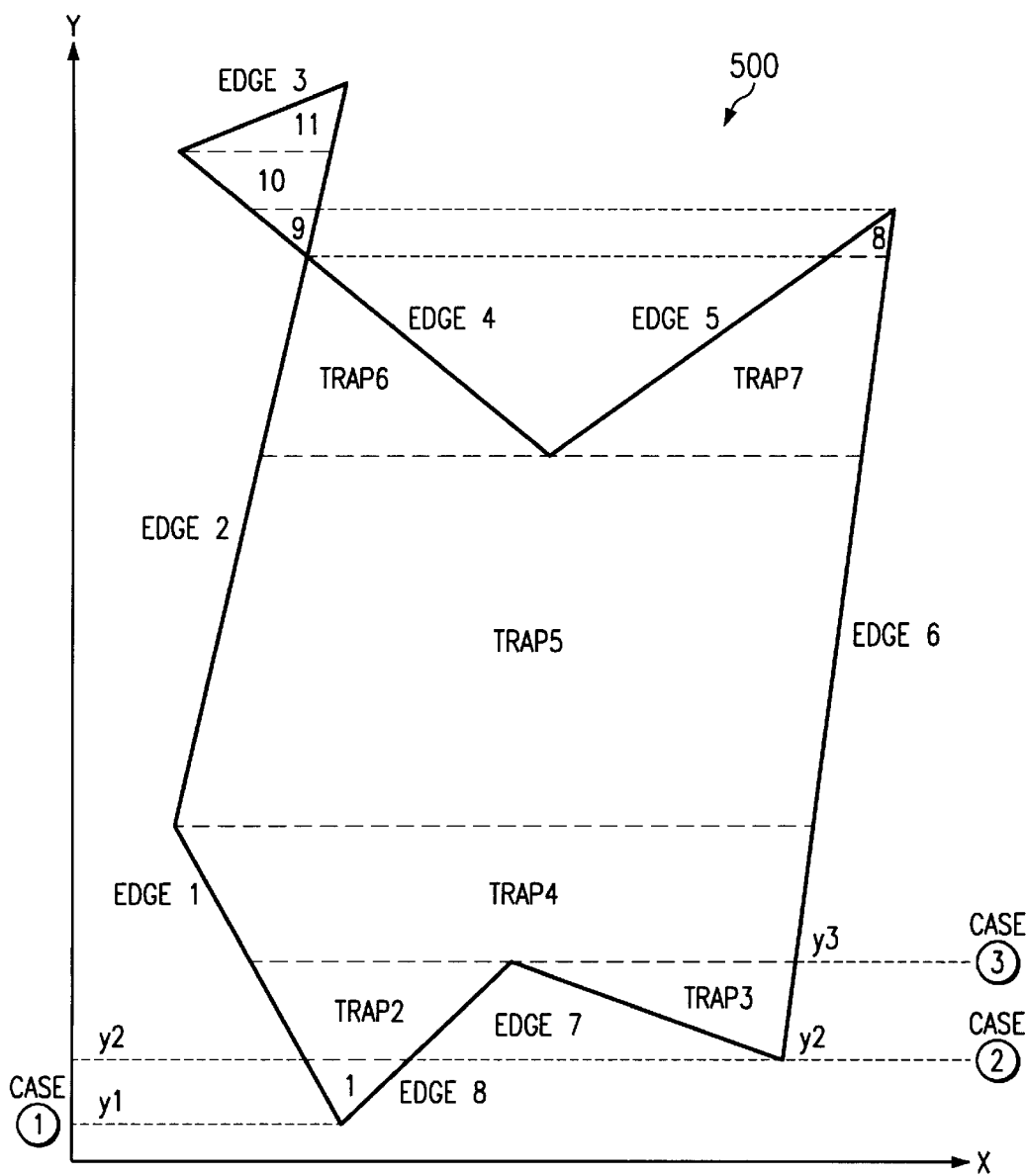
FIG. 20 illustrates trapezoid formation method in an example polygon.

FIG. 20 illustrates trapezoid formation in an example polygon. Trapezoid 500 includes edges 1 to 8 forming a closed curve linking intermediate vertices. The conversion of the polygon path consisting of a list of its edges to trapezoids is carried out from the polygons minimum Y coordinate to its maximum Y coordinate. The path is specified as a list of edges. Each edge has a minimum X value Xbottom, a minimum Y value Ymin, a maximum Y value Ymax and a slope. The polygon is defined by an edge array which is sorted based upon increasing Ymin values. Initially, all those edges which intersect the horizontal line passing through the minimum Y coordinate are used in formation of active edge table. Referring to FIG. 20, in case (1) at scan line Y1, the active edge table is (edge1, edge8). In case (2) at scan line Y2, the active edge table is (edge1, edge6, edge7, edge8). In case (3) the active edge table is (edge1, edge6). These active edges are sorted in order of their X coordinates. The areas between the sorted or adjacent active edges which are to be filled are determined either of the two fill rules, the even-odd rule or the winding number rule.

Each pair of adjacent active edges whose intervening area is to be filled is used to form a trapezoid. The lower Y limit Ybottom of these trapezoids is the minimum Y coordinate of the edges in the active edge table. The upper Y limit is the lowest point at which an edge transition occurs, i.e, an active edge ends or another edge begins. Also, edge intersections can disturb the X-sorted order of the active edge table. Hence, the upper Y limit Ytop of each trapezoids is determined by the minimum of the following:

(1) the Y coordinate at which one or more of the currently active edges cease to have coherence, such as the minimum of Ymax of all active edges;

(2) the Y coordinate at which one or more edges not currently active begin to have coherence, such as the minimum of Ymin of succeeding edges not yet active; or (3) the Y coordinate at which X coordinates of currently active edges become out-of-sort, such as the minimum Y coordinates of any edge intersections.

After each trapezoid or set of trapezoids is formed, the upper Y limit Ytop becomes the new lower limit Ybottom. The Xbottom field of all active edges is updated to their values at the new lower limit Ybottom. The active edge table is updated by discarding of edges which no longer intersect the current scan lines and including hitherto inactive edges which begin to intersect the current scan line. The active edge table is then resorted on the X coordinates and the above procedure continued until all edges are considered.

In the preferred embodiment a path-to-trapezoid routine is invoked by master processor 60 in one of the digital image/graphics processors 71, 72, 73 or 74 for every polygon. The path-to-trapezoid routine running on the digital image/graphics processor 71, 72, 73 or 74 takes the polygon defined in terms of a path consisting of a plurality of edges and generates a set of trapezoid display list elements. The path may be concave or convex and may be self intersecting (see FIG. 20) .

In the preferred embodiment edges are specified in four fields: Ymin; Xbottom; Ymax; and Slope. These data elements are preferably stored as signed twos complement fractional format with most significant bit as sign bit and a 16 bit fraction. The sign bit of the Ymax field is preferably used to represent the direction of the edge as defined above.

The polygon path to trapezoid conversion method consists of the following steps:

Step 1: Fetch the edge list from external memory and store in the data memories 22, 23, 24, 27, 28, 29, 32, 33, 34, 37, 38 and 39 corresponding to the digital image/graphics processor.

Step 2: Sort the edges on the basis of Ymin.

Step 3: Determine the currently active edges.

Step 4: Sort the active edges on the basis of Xbottom.

Step 5: Determine the upper Y coordinate (Ytop) after consideration of possible edge intersections.

Step 6: Determine whether to fill between active edges using the fill rule specified in the page description file. PostScript files specify either the even-odd rule or the winding-number rule. This generates trapezoids on the current scan line for the currently active edges.

Step 7: Move to the current scan line to Ytop, selecting this as the next Ybottom, and update the list of active edges. This involves deleting edges no longer intersecting the current scan line and adding edges newly intersecting the current scan line.

Step 8: Repeat steps 5 to 8 until all edges have been considered.

Polygons can have edges numbering from 2 to an arbitrarily large number. In the preferred embodiment the data defining each edge occupies 16 bytes. Each digital image/graphics processor 71, 72, 73 and 74 has a total on-chip memory of 6Kbytes. Hence, there would be some cases when all edges cannot be accommodated in on-chip memory. In the preferred embodiment, one of memories 22, 23, 24, 27, 28, 29, 32, 33, 34, 37, 38 or 39, having a size of 2 Kbyte is assigned to hold edges. Thus a total of 128 edges can be stored on-chip. When the number of edges in a polygon is less than 128, then there is enough memory to store the entire list of edges for sorting. When the number of edges is greater than 128, then the entire list cannot be in memory at the same time. Portions of the list of edges are fetched onto on-chip memory in blocks and individually sorted. A merge-sort routine is then used to merge the individually sorted blocks. In typical PostScript files, only about 1% or 20 of all polygons have more than 128 edges.

The polygon to trapezoid method preferably employs two different sort routines, an insertion sort and a merge sort. The insertion sort is invoked when the number of edges is less than about 10 and the merge sort used otherwise. When the number of edges exceeds 128, a merge sort routine is required. The total edge list is divided into sub-blocks of 100 edges occupying 1600 bytes. These sub-block are individually fetched from off-chip memory entirely, sorted and returned to off-chip memory. After all sub-blocks have been sorted, a the sub-blocks are two-way merged. During this edge sorting routine, the entire memory area of the digital image/graphics processor constituted by memories 22, 23 and 23, memories 27, 28 and 29, memories 32, 33 and 34 or memories 37, 39 and 39 is used to store the edges.

Figure 21:
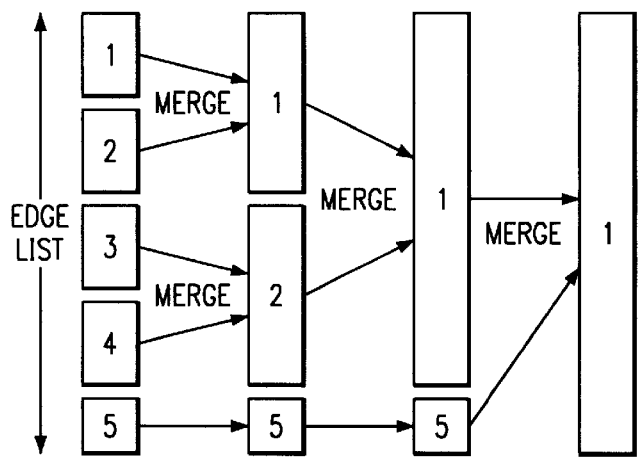
FIG. 21 schematically illustrates a merge sort process when the edge array cannot fit within the on-chip memory of the multiprocessor integrated circuit.

FIG. 21 schematically illustrates this merge sort process. The five sub-blocks 501, 502, 503, 504 and 505 are individually sorted. Then these sorted blocks are merged. First, sub-blocks 501 and 502 are merged forming sub-block 506. Next, sub-blocks 503 and 504 are merged forming sub-block 507. Sub-blocks 506 and 507 are merged forming sub-block 508. Lastly, sub-blocks 505 and 508 are merged forming sorted edge array 509.

During initial sorting of each sub-block of 100 edges, the merge sort routine requires auxiliary storage area of another 100 edges (1600 bytes). The first block is fetched and then sorted. During this period, a transfer controller 80 request for another block of 100 edges is issued. The sorted block is transferred back to off-chip memory while the on-chip edges are being sorted. The total memory space required is 6.4Kbytes. This amount of memory is obtained by using all three corresponding data memories and a portion of the corresponding parameter memory 25, 30, 35 or 40.

The individually sorted sub-blocks are then merged in pairs. During this two-way merging of sub-blocks, irrespective of the size of the sub-blocks, only 64 edges of the two sub-blocks to be merged are fetched. Portions of the pre-sorted blocks are fetched for merging of sub-blocks. Two of the data memories are used for sorting the edges to be merged and the third data memory and part of the parameter memory is used as auxiliary storage.

Figure 22:
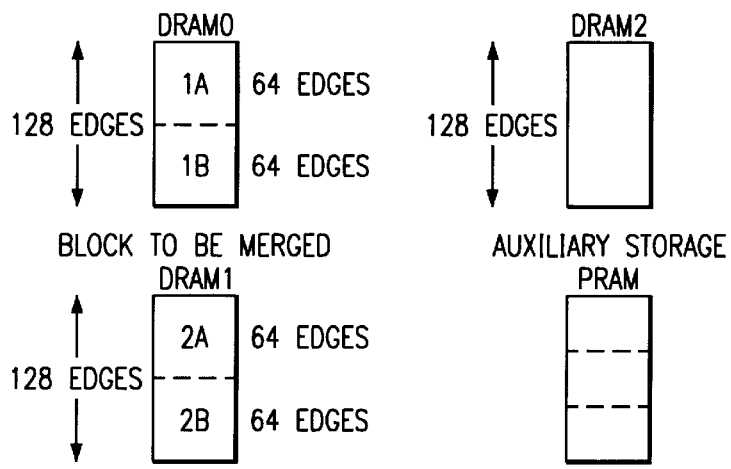
FIG. 22 schematically illustrates memory usage during the merge sort operation illustrated in FIG. 21.

FIG. 22 schematically illustrates memory usage during this merge sort operation. Two blocks 1 and 2 are to be merged. Sixty four edges of block 1 are fetched and stored in the upper half of data memory 0 (illustrated as 1A). Sixty four edges of block 2 are fetched and stored in the upper half of data memory 1 (illustrated as 2A). The merging routine begins, with results of the merging stored in data memory 2. At the same time transfer controller 80 transfers of another 64 edges of block 1 to data memory 0 to stored at 1B and 64 edges of block 2 to data memory 1 to be stored at 2B. Whenever processing of either the A or B portion of either data memory 0 or data memory is complete, a transfer controller 80 transfer is initiated to fill it with another set of 64 edges. Whenever data memory 3 is filled, its contents are transferred to off-chip memory via transfer controller 80. This fully utilizes the memory available to each digital image/graphics processor 71, 72, 73 and 74.

A secondary sort of the edges on the basis of the Xbottom field is also required. In this sort, if the Xbottom of two edges are equal, the sorting is done on the basis of their slope field. In more than 99% of typical cases, the entire active edge table has less than 128 edges. Thus this secondary sort can usually be performed within the corresponding data memory of digital image/graphics processors 71, 72, 73 and 74. If there are more than 128 edges in the polygon, then a procedure similar to that outlined above is followed.

The method next forms the active edge table for the current scan line. The Ymin of the first edge array element is taken as first current scan line. This is taken as Ybottom of the first formed trapezoids. The active edge table comprises all those edges which intersect the current scan line. Referring to FIG. 20, some examples of active edge table contents are given. In case (1) at scan line Y1, the active edge table is (edge1, edge8). In case (2) at scan line Y2, the active edge table is (edge1, edge6, edge7, edge8). In case (3) at scan line Y3, the active edge table is (edge1, edge6).

The method next determines a quantity Ytop, which is the top of the currently formed trapezoid. Ytop is an edge-coherence transition point. At Ytop some edges no longer intersect the scan line, some edges begin to intersect the scan line or an edge intersects another edge. Initially Ytop is set to the minimum of the Ymax of all active edges and Ymin of the first inactive edge in the edge list. The edges in active edge table are then sorted on the basis of their Xbottom field.

If is there were no edge intersections between the current scan line Y coordinates and Ytop, then trapezoids could be formed using the active edges. The method therefore checks for edge intersections. The check processes only those edges which are in the active edge table. Hence if the total number of edges in a polygon is N, each edge is not tested for intersection with all other (N−1) edges. The method only checks for intersections of active edges between the Y coordinate of the current scan line and the current Ytop. In the preferred embodiment, the method uses the fact that the edges have been sorted on the basis of their Xbottom fields at the Y coordinate of the current scan line. If none of the edges intersect between the coordinates the current scan line and Ytop, then the X coordinates of these edges would remain sorted at Ytop too. The X coordinate for each active edge at Ytop is computed from the equation:

$$edge[N].X' = edge[N].X + (Ytop-current\_Y)*edge[N].slope$$

where: edge[N].X ' is the X coordinate of edge N at Ytop; edge [N].X is the X coordinate of edge N at current_Y; current_Y is the Y coordinate of the current scan line; and edge[N].slope is the slope of edge N. The edge[N] .X' of all active edges will be sorted in the same order as the edge [N].X if there are no intersections. This intersection check can be made by only comparing X-coordinates of edges adjacent in the list. For example, if all adjacent pairs are in sort, then the entire set of edges is in sort. However, if any pair of edges adjacent in the active edge list are out of sort, then there is at least one edge intersection between the Y coordinates of the current scan line and Ytop.

Once detected, there are three possible approaches to handling edge intersections:

Approach A: Each pair of edges it is tested for intersection. If an intersection is detected, then the intersection points for each pair of intersecting edges are computed using a line intersection routine. This approach is suitable for floating point processors such as master processor 60. The Y coordinate of the intersection point can be determined as detailed below. An edge can be defined by equation:

$$ax+by+c=0$$

For a first edge having with vertices (X1,Y1) and (X2,Y2) the coefficients are:
 a1=Y2−Y1
 b1=X1−X2
 c1=X2*Y1−X1*Y2
For a first edge having with vertices (X1, Y3) and (X4, Y4) the coefficients are:
 a2=Y4−Y3
 b2=X3−X4
 c2=X4*Y3−X3*Y4
The Y coordinate of the intersection point is computed as:

$$Y=(c1-c2)/(b2-b1)$$

When all pairs of edges have been tested for intersection and intersection points determined, the intersection points are sorted in ascending order of their Y coordinates. Now trapezoids are generated for all active edges between the current scan line and the first intersection point, the first intersection point and the second, the second and the third, etc., and finally the last intersection point and Ytop.

Figure 23:
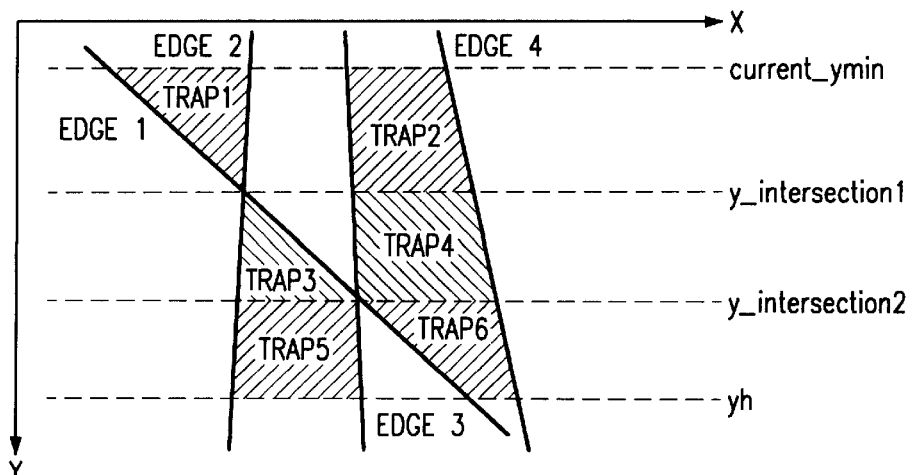
FIG. 23 illustrates an example of trapezoids generated according to this invention.

FIG. 23 illustrates an example of the resulting trapezoids. Generation of trapezoids for all active edges at all edge intersections may result in generation of smaller trapezoids than necessary. Note in FIG. 23 that trapezoids 2 and 4 could be combined into a single trapezoid because the intersection at y_intersection1 does not involve the edges 3 and 4. However, generation of these smaller trapezoids causes no problems. Further, there is no need for complex procedures to determine which edges intersect when generating the trapezoids.

Approach B: Each pair of edges it is tested for intersection. The intersection points for each pair of intersecting edges are computed using a midpoint subdivision computation. This computation is suitable for fixed point processors such as digital image/graphics processors 71, 72, 73 and 74. In this approach, the intersection point of two edges can be determined with desired accuracy using an iterative method.

Figure 24:
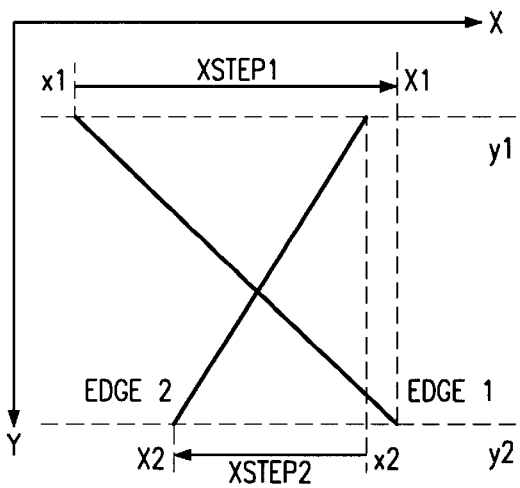
FIG. 24 illustrates the midpoint intersection detection process of this invention.

FIG. 24 illustrates this midpoint detection process. The subject edges edge1 and edge2 are found to intersect between the current scan line as Ybottom and Ytop. If x1 and x2 are the respective X coordinates at Ybottom and X1 and X2 those at Ytop, then at Ybottom, x1 and x2 are sorted so that x2>x1. Then at Ytop, X2<X1 since the edges have intersected. The difference in the X coordinates of the respective edges at Ytop and Ybottom are computed:

$$x1step=X1-x1=(Ytop-Ybottom)*edge1.slope$$

$$x2step=X2-x2=(Ytop-Ybottom)*edge2.slope$$

where: edge1.slope is the slope of the first edge; and edge2.slope is the slope of the second edge. At Y coordinate Y=(y1+y2)/2, the X coordinates are:
 X1=(x1+x1step)/2
 X2=(x2+x2step)/2
If X2>X1 at Y, then the intersection lies between Y and Ytop, else if X2<X1, then intersection lies between Ybottom and Y. A new midpoint point is chosen at either:
 Y=(Y+Ybottom)/2; or
 Y=(Y+Ytop)/2
and the X coordinates at the new midpoint Y are computed as above. The same procedure repeated until the Y coordinate of the intersection point is obtained with the desired accuracy.

Pseudocode for the procedure is listed below:
Y=(y1+y2)>>1 [÷2 via right shift]
x1step=(Y−Y1) * edge1.slope
x2step=(Y−Yl) * edge2.slope
while (1) (do until Y of desired accuracy is found)
 Y=(y1+y2)>>1 [÷2 via right shift]
 X1=x1+x1step
 X2=x2+x2step
 diff=X1−X2
 if (abs(diff)≦desired_accuracy)
  Y is the desired intersection point
  return Y
 else
  if (diff>0)
   Y2=Y; [the intersection lies between Y1 and Y, move upper limit Y2 to Y]

```
else if (diff<0) [the intersection lies between Y and Y2]
    x1=X1; [move lower limit Y1 to Y]
    x2=X2;
    y1 =Y;
(end else)
x1step=x1step>>1 [the X increment to the next midpoint is
    half the present increment, ÷2 via right shift]
X2step=x2step>>1
(end while)
```

As can be seen, this method involves use of only 2 multiply operations and a one place right shift is substituted for division. Thus this method is well suited for fixed point digital signal processors such as digital image/graphics processors 71, 72, 73 and 74.

When all pairs of edges have been tested for intersection and intersection points determined, the intersection points are sorted in ascending order of their Y coordinates. Now trapezoids are generated for all active edges as previously described with regard to Approach A.

Approach C: In this method edge intersection points are not computed. Runs are generated for filling of areas between the sorted active edges for each scan line beginning with the current scan line and ending with the scan line encompassing Ytop.

Figure 25:
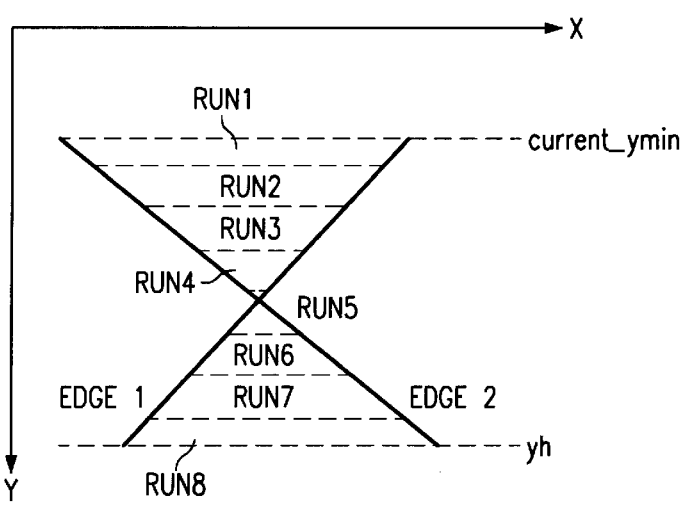
FIG. 25 illustrates an example of the generation of fill runs according to an alternative method of handling the case of edge intersections.

FIG. 25 illustrates an example of the generation of fill runs according to this alternative. Note that the intersection occurs between scan lines at run 5 (which is a single point fill) and run 6. At each scan line between the then current scan line and Ytop the X coordinates of each edge is computed. This computation is similar to the original computation for detection of intersections between the current scan line and Ytop as follows:

$$edge[N].X'''=edge[N].X+(next\_Y-current\_Y)*edge[N].slope$$

where: next_Y is the value of the next scan line. These newly computed X coordinates are checked to determine if the sorting order has changed. If there is no sorting order change, then no intersection has occurred between the two scan lines. If there is a change in the sorting order, then an intersection has occurred. In either case, a fill run is determined for the next scan line based upon application of the appropriate fill rule (Step 6 above) and the then current active edge order. This process repeats for every scan line from the original Ybottom to Ytop. This process in effect produces one-scan-line high trapezoids within the corresponding region. Note that this single scan line process is only employed if the intersection determination (Step 5 above) detects one or more intersections. There is no need for computing fill runs on a scan line basis if there are no intersections within the region under consideration.

In Step 6 of this method, trapezoids are formed for all edges in the active edge table. If no intersections exist between scan line and Ytop, then trapezoids are formed with a lower Y coordinate Ybottom equal to the current scan line and an upper Y coordinate Ytop equal to the Y coordinate of the next vertex. This could be a Ymin of an edge or the Ymax of an edge. If intersections are detected between current scan lined and Ytop, the one of the approaches A, B or C described in the previous section is followed to determine Ytop. These generally find the next intersection in Y.

The Xleft and Xright edges of these trapezoids correspond to edges of the polygon path. The active edges have been sorted on the basis of their Xbottom field. Trapezoids are formed when the area between two edges is to be filled. Consider two adjacent edges edge1 and edge2, where edge1.Xbottom is less than edge2.Xbottom. If the area between these edges is to be filled to form the trapezoid, then Xleft of the trapezoid is edge1 from Ybottom to Ytop and Xright of the trapezoid is edge 2 from Ybottom to Ytop.

The areas between the active edges which are to be filled to form trapezoids are determined using a fill rule specified by the page description file. The fill rules specified in PostScript files are the even-odd rule or the winding number rule.

Figure 26:
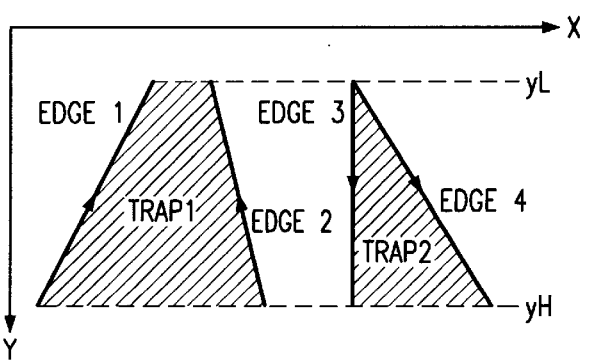
FIG. 26 illustrates an example of the even-odd fill rule in formation of trapezoids.

FIG. 26 illustrates use of the even-odd rule. The number of active edges is counted from minimum X. The area where this count is odd is filled to form the trapezoid. The area where this count is even is not filled. This effectively pairs the Xbottom-sorted active edges and fills the area between each such pair. In FIG. 25, the area between edge1 and edge 1 has an odd edge count and is filled as trapezoid 1. Likewise the area between edge 3 and edge 4, which is filled as trapezoid 2. The area between edge 2 and edge 3 has an even edge count and is not filled.

Figure 27:
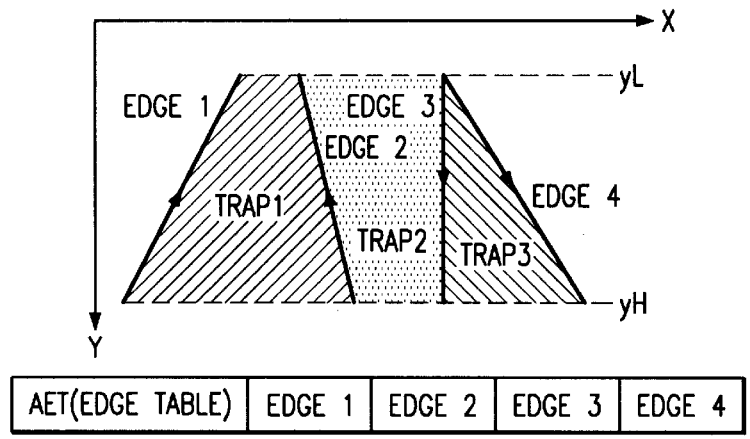
FIG. 27 illustrates an example of the winding number fill rule in formation of trapezoids.

FIG. 27 illustrates the use of the winding number rule. Note that FIG. 27 illustrates a direction for each edge. This direction is taken from the direction field in the description of the edge from the original polygon definition that is used in the active edge table. A count denoted in_count is incremented for every edge with an UP direction and decremented for every edge with a DOWN direction. The count in_count is updated for each edge in sequence. If in count is non-zero, then the area to the right of the edge is to be filled. FIG. 27 illustrates no trapezoid formation to the left of edge 1. There in_count is zero. Trapezoid 1 is formed between edges 1 and 2, where in_count is 1. Trapezoid 2 is formed between edges 2 and 3, where the upward sloping edges 1 and 2 result in an in_count of 2. Downwardly sloping edge 3 results in an in_count of 1 between edges 3 and 4. Trapezoid 3 is formed in this region. Downwardly sloping edge 4 results in an in_count of 0 to the right of edge 4. Thus no trapezoid is formed in the region.

Note that the even-odd fill rule and the winding-number fill rule in general cause formation of differing trapezoids. Note that the even-odd rule does not form a trapezoid between edges 2 and 3 of FIGS. 26 and 27, while the winding-number rule does form a trapezoid here. Thus it is clear that the page description language file describing the page to be printed must specify the fill rule to be used.

After application of the selected fill rule, the method prepares for generation of the next trapezoid. The Ytop of the last formed trapezoid becomes the Ybottom of the next trapezoid to be formed. Membership in the active edge table is updated. Edges no longer intersecting the current scan line (Ybottom) are deleted and edges newly intersecting the current scan line are added. Then the Xbottom field of every edge in the active edge table is updated. For every entry N in the active edge table AET:

$$AET[N].Xbottom=(Ytop-Ybottom)*AET[N].slope$$

The new Xbottom values of the edges in the active edge table are tested for out-of-sort condition. If these edges are correctly sorted in Xbottom, then no edge intersections occur between Ybottom and Ytop. If these edges are not correctly sorted, then at least one edge intersection has occurred. In the manner previously described, if an intersection is determined, then Ytop is set to the Y coordinate of the next intersection point. The process returns to Step 5. This process repeats until all path edges in the edge list have been considered.

This technique can be used to convert polygons of all types, including self-intersecting polygons, polygons with holes, convex/concave polygons and split polygons. An advantage of this method is that the active edge table and the edge table can occupy the same memory. That is the active edge table operates in place rather than as a linked list as in the prior art. This method can be easily modified to convert N polygons into trapezoids while preserving the opacity of each polygon. This is accomplished by tagging the edges of each polygon and then operating on a combined list of active edges of all N polygons.

Figure 28:
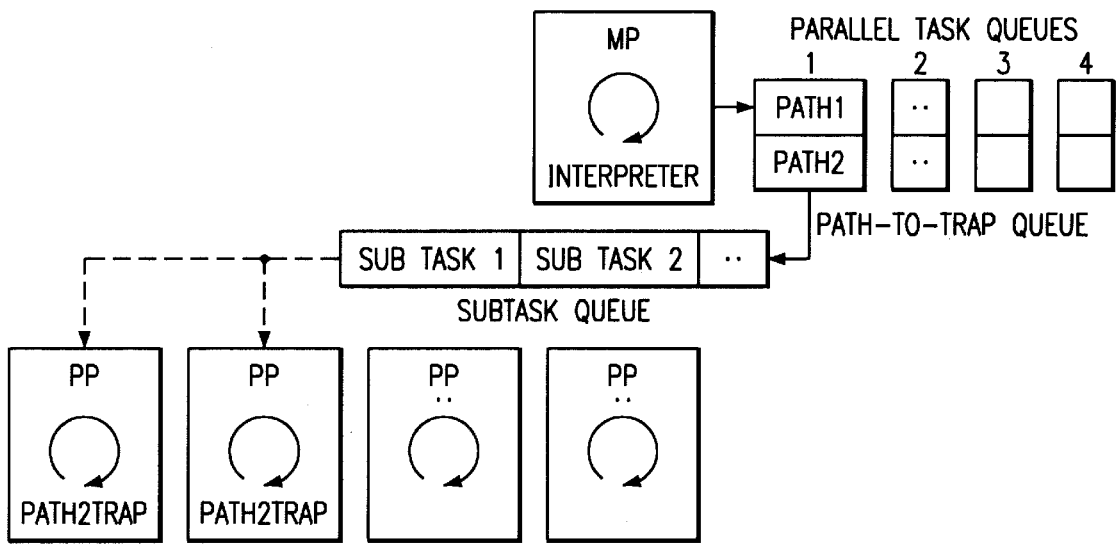
FIG. 28 schematically illustrates how master processor spawns subtasks to digital image/graphics processors in the multiprocessor integrated circuit illustrated in FIG. 2.

FIG. 28 illustrates schematically how master processor 60 can spawn subtasks to one or more of the digital image/graphics processors 71, 72, 73 and 74. A significant time advantage can be gained with a digital image/graphics processor 71, 72, 73 and 74 implementation of the subtask. Master processor 60 handles interpretation of files and creates subtasks for execution on digital image/graphics processors 71, 72, 73 and 74. Master processor 60 forms parallel task queues 601, 602, 603 and 404. Each of these parallel task queues 601, 602, 603 and 604 may handle plural polygon paths. Depending on the current loading of master processor 60, each of these polygon path tasks may spawn one or more tasks for digital image/graphics processors 71, 72, 73 and 74. Examples of the kind of subtasks are edge sorting, described above with reference to FIGS. 21 and 22, and trapezoid generation, described above with reference to FIGS. 23, 24 and 25. In trapezoid generation when edge intersections are detected, Approach A is better suited to implementation on master processor 60 while Approaches B and C are better suited to implementation on digital image/graphics processors 71, 72, 73 and 74. The subtask spawning could provide separate subtasks for sorting and trapezoid generation which are implemented on the same digital image/graphics processor. Alternatively, these separate tasks could be pipelined on different ones of the digital image/graphics processors 71, 72, 73 and 74. FIG. 28 illustrates a subtask queue 610 which stores subtasks before assignment to digital image/graphics processors 71, 72, 73 and 74. Because digital image/graphics processors 71, 72, 73 and 74 operate identically, individual subtasks in subtask queue 610 may be assigned to the next available digital image/graphics processor.

Digital image/graphics processors 71, 72, 73 and 74 have the ability to achieve faster execution time than on master processor 60. This is due to better suitability of digital image/graphics processor 71, 72, 73 and 74 architecture than that of master processor 60 for the task. Digital image/graphics processors 71, 72, 73 and 74 have a large set of arithmetic logic unit configurations, address arithmetic facility, capability of up to four parallel instructions. Table 5 shows sample figures of comparative timings for the C implementation of the path-to-trapezoid technique on master processor 60 and the unoptimized digital image/graphics processor 71, 72, 73 and 74 assembly code implementation of the same task.

TABLE 5

| Number of Polygon Edges | C implementation on Master Processor (clocks) | Unoptimized Assembly Code Implementation on Digital Image/Graphics Processor (clocks) |
| --- | --- | --- |
| 8 | 8250 | 7036 |
| 79 | 122,250 | 86,040 |

The spawning of subtasks assigned to digital image/graphics processors 71, 72, 73 and 74 frees of significant time on master processor 60 for other interpretation tasks. An additional benefit of putting a subtask on a digital image/graphics processor 71, 72, 73 and 74 is a possible reduction in rendering time. With the subtask on digital image/graphics processor 71, 72, 73 and 74, the usage of the transfer controller 80 is more favorable for the rendering tasks, resulting in speeding up of the rendering. This is because if the subtask resided on the master processor 60, the associated transfer controller 80 requests would have higher priority than those of the rendering digital image/graphics processors 71, 72, 73 and 74, whereas if the subtask resided on a digital image/graphics processor 71, 72, 73 and 74, a lower or equal priority could be accorded to its transfer controller 80 requests.

What is claimed is:

1. A computer implemented method of clipping a subject polygon by a clip polygon and forming trapezoids filling the clipped area comprising the steps of:

(1) representing the subject polygon and the clip polygon each as a set of edges, each edge represented by minimum Y coordinate, a minimum X coordinate, a maximum Y coordinate and a slope;

(2) sorting said subject polygon set of edges and said clip polygon set of edges in increasing values of minimum Y coordinate and storing said sorted set of edges as an array of edges;

(3) determining the greatest minimum Y coordinate of a first edge entry in said subject polygon set of edges and a first edge entry in said clip polygon set of edges, thereby determining a bottom Y coordinate of a next trapezoid to be formed;

(4) if said clip polygon set of edges included said bottom Y coordinate of said next trapezoid, then discarding any edges of the subject polygon having a maximum Y coordinate less than said bottom Y coordinate of said next trapezoid;

(5) if said subject polygon set of edges included said bottom Y coordinate of said next trapezoid, then discarding any edges of the clip polygon having a maximum Y coordinate less than said bottom Y coordinate of said next trapezoid;

(6) determining a next greatest minimum Y coordinate of a next edge entry in said subject polygon set of edges and a next edge entry in said clip polygon set of edges, thereby determining a top Y coordinate of said next trapezoid to be formed;

(7) ending clipping and trapezoid formation if said top Y coordinate of said next trapezoid to be formed is greater than said maximum Y coordinate of all of said edges of said subject polygon;

(8) forming an active edge table consisting of all edges of either said subject polygon set of edges or said clip polygon set of edges intersecting said bottom Y coordinate;

(9) sorting said active edge table in increasing order of said the minimum X value;

(10) determining if any edge in said active edge table intersects any other edge in said active edge table between said bottom Y value and said top Y value;

(11) if any edge intersection was detected, then
     forming a set of all of such intersections,
     calculating a Y coordinate of each such intersection,
     sorting said set of intersections in increasing Y coordinate of intersection,
     for each intersection beginning with a first intersection in said sorted set of intersections:

set said top Y of said next trapezoid to be formed as said Y coordinate of said intersection, set a left edge of said next trapezoid to be formed as a next subject polygon active edge or a next clip polygon active edge having the lesser minimum X coordinate, set right edge of said next trapezoid to be formed as a next subject polygon active edge or a next clip polygon active edge having the lesser minimum X coordinate, if a region between said left edge and said right edge is inside both polygons, form the next trapezoid with edges the current bottom Y coordinate, top Y coordinate, right edge and left edge, set a next bottom Y coordinate as the current top Y coordinate, setting said top Y of said next trapezoid to be formed as said Y coordinate of a next greatest minimum Y coordinate of a next edge entry in said subject polygon set of edges and a next edge entry in said clip polygon set of edges;

setting a left edge of said next trapezoid to be formed as a next subject polygon active edge or a next clip polygon active edge having the lesser minimum X coordinate, setting right edge of said next trapezoid to be formed as a next subject polygon active edge or a next clip polygon active edge having the lesser minimum X coordinate, if a region between said left edge and said right edge is inside both polygons, form the next trapezoid with edges the current bottom Y coordinate, top Y coordinate, right edge and left edge,

(12) if no edge intersection was detected, then setting a left edge of said next trapezoid to be formed as a next subject polygon active edge or a next clip polygon active edge having the lesser minimum X coordinate, setting right edge of said next trapezoid to be formed as a next subject polygon active edge or a next clip polygon active edge having the lesser minimum X coordinate, if a region between said left edge and said right edge is inside both polygons, form the next trapezoid with edges the current bottom Y coordinate, top Y coordinate, right edge and left edge,

(13) setting a next bottom Y coordinate as the current top Y coordinate;

(14) updating said active edge table to include only those edges that intersect a scan line at said bottom Y coordinate; and

(15) repeating steps 5 to 14 until all edges in one of said subject polygon edge array or said clip polygon edge array have been considered.

2. A computer implemented method of clipping a subject polygon by a clip polygon and forming trapezoids filling the clipped area comprising the steps of:

(1) representing the subject polygon and the clip polygon each as a set of edges, each edge represented by minimum Y coordinate, a minimum X coordinate, a maximum Y coordinate and a slope;

(2) sorting said subject polygon set of edges and said clip polygon set of edges in increasing values of minimum Y coordinate and storing said sorted set of edges as an array of edges;

(3) determining the greatest minimum Y coordinate of a first edge entry in said subject polygon set of edges and a first edge entry in said clip polygon set of edges, thereby determining a bottom Y coordinate of a next trapezoid to be formed;

(4) detecting all intersections between edges;

(5) forming trapezoids for all areas within both said subject polygon and said clip polygon between successive pairs in the direction perpendicular to the scan line dimension of all edge ends and edge intersections between said greatest minimum Y coordinate of said subject polygon edges and said clip polygon edges and a smallest maximum Y coordinate of said subject polygon and said clip polygon edges.

3. A printer comprising:

a transceiver adapted for bidirectional communication with a communications channel;

a memory;

a print engine adapted for placing color dots on a printed page according to received image data and control signals; and a programmable data processor connected to said transceiver, said memory and said print engine, said programmable data processor programmed to receive print data corresponding to pages to be printed from the communications channel via said transceiver;

convert said print data into image data and control signals for supply to said print engine for printing a corresponding page, said conversion including clipping a subject polygon by a clip polygon and forming trapezoids filling the clipped area by:

representing the subject polygon and the clip polygon each as a set of edges, each edge represented by minimum Y coordinate, a minimum X coordinate, a maximum Y coordinate and a slope, sorting said subject polygon set of edges and said clip polygon set of edges in increasing values of minimum Y coordinate and storing said sorted set of edges as an array of edges, determining the greatest minimum Y coordinate of a first edge entry in said subject polygon set of edges and a first edge entry in said clip polygon set of edges, thereby determining a bottom Y coordinate of a next trapezoid to be formed, detecting all intersections between edges, forming trapezoids for all areas within both said subject polygon and said clip polygon between successive pairs in the direction perpendicular to the scan line dimension of all edge ends and edge intersections between said greatest minimum Y coordinate of said subject polygon edges and said clip polygon edges and a smallest maximum Y coordinate of said subject polygon and said clip polygon edges; and controlling said print engine according to said image data and control signals to print a corresponding page.

* * * * *